US006944034B1

(12) United States Patent
Shteynberg et al.

(10) Patent No.: US 6,944,034 B1
(45) Date of Patent: Sep. 13, 2005

(54) SYSTEM AND METHOD FOR INPUT CURRENT SHAPING IN A POWER CONVERTER

(75) Inventors: Anatoly Shteynberg, San Jose, CA (US); Junjie Zheng, Campbell, CA (US); Harry Rodriguez, Gilroy, CA (US); Mark D. Telefus, Orinda, CA (US); Dongsheng Zhou, San Jose, CA (US); Arthur J. Collmeyer, Incline Village, NV (US)

(73) Assignee: iWatt Inc., Los Gatos, CA (US)

( * ) Notice: Subject to any disclaimer, the term of this patent is extended or adjusted under 35 U.S.C. 154(b) by 108 days.

(21) Appl. No.: 10/610,977

(22) Filed: Jun. 30, 2003

(51) Int. Cl.[7] .......................... H02M 3/335; G05F 1/40
(52) U.S. Cl. ...................... 363/21.13; 363/17; 363/95; 323/282; 323/299
(58) Field of Search ............................. 36/21.4, 21.7, 36/20, 97, 95, 89, 132, 37, 21.13, 17; 323/222, 323/282, 207, 285, 205, 283, 299

(56) References Cited

U.S. PATENT DOCUMENTS

| | | |
|---|---|---|
| 3,769,568 A | 10/1973 | Hamilton et al. |
| 4,521,672 A | 6/1985 | Fronius |
| 4,823,070 A | 4/1989 | Nelson |
| 5,138,543 A | 8/1992 | Harm et al. |
| 5,305,192 A | 4/1994 | Bonte et al. |
| 5,325,282 A * | 6/1994 | Bansard .................... 363/21.13 |
| 5,438,499 A | 8/1995 | Bonte et al. |
| 5,638,265 A * | 6/1997 | Gabor ......................... 363/89 |
| 5,751,561 A | 5/1998 | Ho et al. |
| 5,757,626 A * | 5/1998 | Jovanovic et al. ....... 363/21.04 |
| 5,841,643 A | 11/1998 | Schenkel |
| 5,991,172 A * | 11/1999 | Jovanovic et al. ....... 363/21.14 |
| 6,038,146 A | 3/2000 | Luo et al. |
| 6,043,633 A * | 3/2000 | Lev et al. ................... 323/222 |
| 6,275,018 B1 | 8/2001 | Telefus et al. |
| 6,304,473 B1 | 10/2001 | Telefus et al. |
| 6,324,079 B1 | 11/2001 | Collmeyer et al. |
| 6,370,039 B1 | 4/2002 | Telefus |
| 6,381,150 B2 | 4/2002 | Telefus |
| 6,385,059 B1 | 5/2002 | Telefus et al. |
| 6,396,722 B2 | 5/2002 | Lin |
| 6,404,173 B1 | 6/2002 | Telefus |
| 6,434,021 B1 | 8/2002 | Collmeyer et al. |
| 6,621,255 B2 | 9/2003 | Telefus |

OTHER PUBLICATIONS

"NCP1651—Single Stage Power Factor Control" [online], Oct. 2003, Rev. 5, ON Semiconductor Components Industries LLC, [retrieved Jan. 26, 2004]. Retrieved from Internet: <URL: http://www.onsemiconductor.com/pub/Collateral/NCP1651-D.pdf>.

(Continued)

Primary Examiner—Rajnikant B. Patent
(74) Attorney, Agent, or Firm—Fenwick & West LLP

(57) ABSTRACT

A power converter delivers electrical power from an electrical power source to a load according to a plurality of operation modes corresponding to different levels of input voltage or output current. The power converter comprises a power stage for delivering the electrical power from the power source to the load, a switch in the power stage that electrically couples or decouples the load to the power source, and a switch controller coupled to the switch for controlling the on-times and off-times of the switch according to the plurality of operation modes. Each of the operation modes correspond to associated ranges of at least one of an input voltage to the power converter and an output current from the power converter, where the associated ranges are different for each of the operation modes.

27 Claims, 21 Drawing Sheets

OTHER PUBLICATIONS

"AND8124/D—90W, Universal Input, Single Stage, PFC Converter" [online], Dec. 2003, ON Semiconductor Components Industries LLC, [retrieved Jan. 26, 2004]. Retrieved from Internet: <URL: http://www.onsemiconductor.com/pub/Collateral/AND8124-D.pdf>.

"Linear Technology LT1103/LT1105 Offline Switching Regulator" [online], retrieved on Apr. 12, 2004. Retrieved from Internet: <URL: http://www.linear.com/pdf/11035fd.pdf>.

"Linear Technology LT1725 General Purpose Isolated Flyback Controller" [online], retrieved on Apr. 12, 2004. Retrieved from Internet: <URL: http://www.linear.com/pdf/1725d.pdf>.

Erickson, Robert, et al., "Design of a Simple High-Power-Factor Rectifier Based on the Flyback Converter," Proceedings of IEEE Applied Power Electronics Conference 1990, Mar. 1990, pp. 792-801.

Zhang, Wanfeng, et al., *"A New Predictive Control Strategy for Power Factor Correction,"* Proceedings of IEEE Applied Power Electronics Conference and Exposition, Feb. 2003, vol. 1, pp. 403-409.

*ON Semiconductor NCP1651 Product Review, Single Stage Power Factor Controller*, Revision 1, Semiconductor Components Industries, Apr. 2002.

Unitrade UC1854, UC2854, UC3854 High Power Factor Preregulator, Texas Instruments Incorporated, 1999, no date.

Bibian, Stephane, et al., "Digital Control with Improved Performance for Boost Power Factor Correction Circuits," Applied Power Electronic Conference and Exposition, APEC, 2001, 16th Annual IEEE, vol. 1, pp. 137-143.

Murphy, P., et al., "Digital Control of Power Factor Correction," Dept. of Electrical and Computer Engineering, NC A&T State University; Virginia Tech, CPES Seminar 2003, pp. 341-347, Blacksburg, VA, Apr. 27-29, 2003.

Dixon, Lloyd, "High Power Factor Preregulator for Off-Line Power Supplies"[online], Unitrode (Texas Instruments) Power Supply Design Seminar Topics SEM600, 1988, [retrieved on Mar. 1, 2005]. Retrieved from Internet <URL: http://focus.ti.com/docs/training/events/event.jhtml?sku=SEM401005&section=Dates>.

* cited by examiner

| Modes of Operation | $t_{ON}$ | | $t_{OFF}$ | | Notes |
|---|---|---|---|---|---|
| | Steady State | Transient State | Steady State | Transient State | |
| S1 | Fixed | Adjusted to fixed values corresponding to input RMS voltage and output current | Fixed | Adjusted to fixed values corresponding to input RMS voltage and output current | Discontinuous to Critical Discontinuous Mode |
| S2 | Modulated | Adjusted to scale up or down the modulated on-time values | Determined by Critical Discontinuous Mode | | Critical Discontinuous Mode |
| S3 | Fixed | Adjusted to fixed values corresponding to input average voltage | Fixed | Determined by pulse frequency modulation | Discontinuous Mode (Load-dependent) |

FIG. 3D

Total Harmonic Distortion
I/P: 90Vacrms
O/P: 3.6A

Waveform of AC line Input Voltage and Current
I/P: 90Vacrms
O/P: 3.6A

Total Harmonic Distortion
I/P: 230Vacrms
O/P: 3.6A

Waveform of AC line Input Voltage and Current
I/P: 230Vacrms
O/P: 3.6A

SYSTEM AND METHOD FOR INPUT CURRENT SHAPING IN A POWER CONVERTER

TECHNICAL FIELD

The present invention relates generally to power conversion, and more specifically, to a system and method for input current shaping in off-line power supplies.

BACKGROUND OF THE INVENTION

Shaping input current in power supplies to have a sinusoidal waveform has the advantage of reducing or eliminating harmonics that are higher than the fundamental harmonics and of increasing power factor. Power factor in power converters is defined as the ratio of the real power delivered to the load to the apparent power provided by the power source. Regardless of what topology is used in the power converters, power converters should be able to deliver power from the power source to the load with a high power factor and low harmonic distortion. This is because utility companies or government agencies require power factors in power converters to exceed a certain minimum level by regulation.

There were a number of attempts at providing power converters with high power factors. For example, U.S. Pat. No. 5,751,561 to Ho et al. discloses an AC-to-DC power converter that achieves greater than 0.8 power factor correction with greater than 75 percent efficiency using only one power switch, only one magnetic component, only one control loop, and a storage capacitor. U.S. Pat. No. 5,991,172 to Jovanovic et al. also discloses a single stage, single switch flyback converter, in which the turn-on switching losses due to the discharge of the output capacitance of the switch are reduced by turning on the switch when its voltage is minimal. The fly-back converter stage is continuously operated at the boundary of continuous conduction mode (CCM) and discontinuous conduction mode (DCM) by employing a variable frequency control. Furthermore, U.S. Pat. No. 6,038,146 to Luo et al. also discloses an AC-to-DC power converter with high power factor and which minimizes the input charging current flowing through the separate inductor by locating a separate inductor between a full-bridge rectifier and the transformer but out of the storage capacitor's current path.

In general, the power converters in these patents achieve high power factor correction by providing one current shaper inductor along with a transformer and a bulk capacitor for storage of energy. These conventional power converters may work well in a given range of input voltage levels, but none of these conventional power converters can deliver electrical power with high power factors over a broad or full range of input voltage. Because the conventional power converters typically operate in a single mode (such as DCM or CCM) over the entire range of input voltage, they have high power factor over a certain range of input voltage in which they were designed to operate but have low power factor in other ranges of input voltage.

In addition, conventional power converters typically use two closed feedback loops. One closed feedback loop is used for regulating the output voltage to a desired level, and the other closed feedback loop is used for controlling the amplitude of the input current. Accordingly, the implementation of these conventional power converters require complex circuitry further requiring considerable efforts to stabilize them.

Therefore, there is a need for a power converter that can deliver electrical power from a power source to a load with a shaped input current over a wide range of input voltage. There is also a need for a power converter that can be implemented by non-complex circuitry but provides input current close to a reference waveform. Finally, there is a need for a method and system compatible with different topologies of power converters for providing power factor correction over a wide range of input voltage.

SUMMARY OF INVENTION

A power converter delivers electrical power from an electrical power source to a load according to a plurality of operation modes each corresponding to different levels of input voltage or output current. The power converter comprises a power stage for delivering the electrical power from the power source to the load, a switch in the power stage that electrically couples or decouples the load to the power source, and a switch controller coupled to the switch for controlling the on-times and off-times of the switch according to the plurality of operation modes. Each of the operation modes corresponds to associated ranges of at least one of an input voltage to the power converter and an output current from the power converter, where the associated ranges are different for each of the operation modes.

In one embodiment of the present invention, the operation modes include a first operation mode corresponding to a first input voltage range and a second operation mode corresponding to a second input voltage range. In this embodiment, the power converter is a single stage flyback power converter. In the first operation mode, the switch is controlled such that the power converter is operated in discontinuous conduction mode with the on-times and off-times fixed. In the second operation mode, the switch is controlled such that the power converter is operated in critical discontinuous conduction mode (CDCM) with the on-times generated by the switch controller and the off-times determined by the critical discontinuous conduction mode (CDCM).

In one embodiment of the present invention, the first input voltage range corresponds to when the input voltage to the power converter is lower than a predetermined voltage value, e.g., an average input voltage, and the second input voltage range corresponds to when the input voltage to the power converter is higher than the predetermined voltage value.

In still another embodiment of the present invention, the operation modes further include a third operation mode, transition to which is unrelated to input voltage ranges or output current ranges, triggered when the on-times of the switch fall below a predetermined threshold value. In the third operation mode, the switch is controlled such that the power converter is operated in discontinuous conduction mode (DCM) with the on-times determined by an average of the input voltage and the off-times determined by the pulse frequency modulation method of regulation.

In still another embodiment of the present invention, the third operation mode is triggered when the output current becomes lower than a predetermined value. In this embodiment, the power converter is a single stage flyback converter. In the third operation mode, the switch is controlled such that the power converter is operated in discontinuous conduction mode (DCM) with the on-times determined by an average of the input voltage and the off-times determined by the pulse frequency modulation method of regulation.

In still another embodiment of the present invention, a method for controlling a power converter shapes input current to a power converter based on a reference waveform shape according to one of a plurality of operation modes. The method determines waveform synthesis parameters based upon an input voltage signal and the reference waveform shape. The method also selects one of a plurality of operation modes for controlling on-times and off-times of a switch in the power converter, where the operation modes correspond to associated ranges of at least one of an input voltage to the power converter and an output current from the power converter and the associated ranges are different for each of the operation modes. The method synthesizes the input current waveform in real time by controlling the on-times and off-times of the switch based upon the determined waveform synthesis parameters and the determined operation modes. That is, the on-times and off-times of the switch are controlled for every switching cycle of the switch so that the synthesis of the current waveform occurs in real time.

The power converter of the present invention and the method for controlling the power converter can transfer electrical power from a power source to a load with a high power factor over a wide range of input voltage, because different operation modes optimally suited for input current shaping over different ranges of input voltage are used to control the power converter. The power converter and the method for controlling the power converter of the present invention are compatible with different topologies of power converters to provide an input current close to a reference waveform as well as regulation of output voltage over a wide range of input voltage.

BRIEF DESCRIPTION OF THE DRAWINGS

The teachings of the present invention can be readily understood by considering the following detailed description in conjunction with the accompanying drawings.

FIG. 3D is a table summarizing the operation modes of the power converter shown in FIG. 2B.

DETAILED DESCRIPTION OF EMBODIMENTS

Figure 1A:
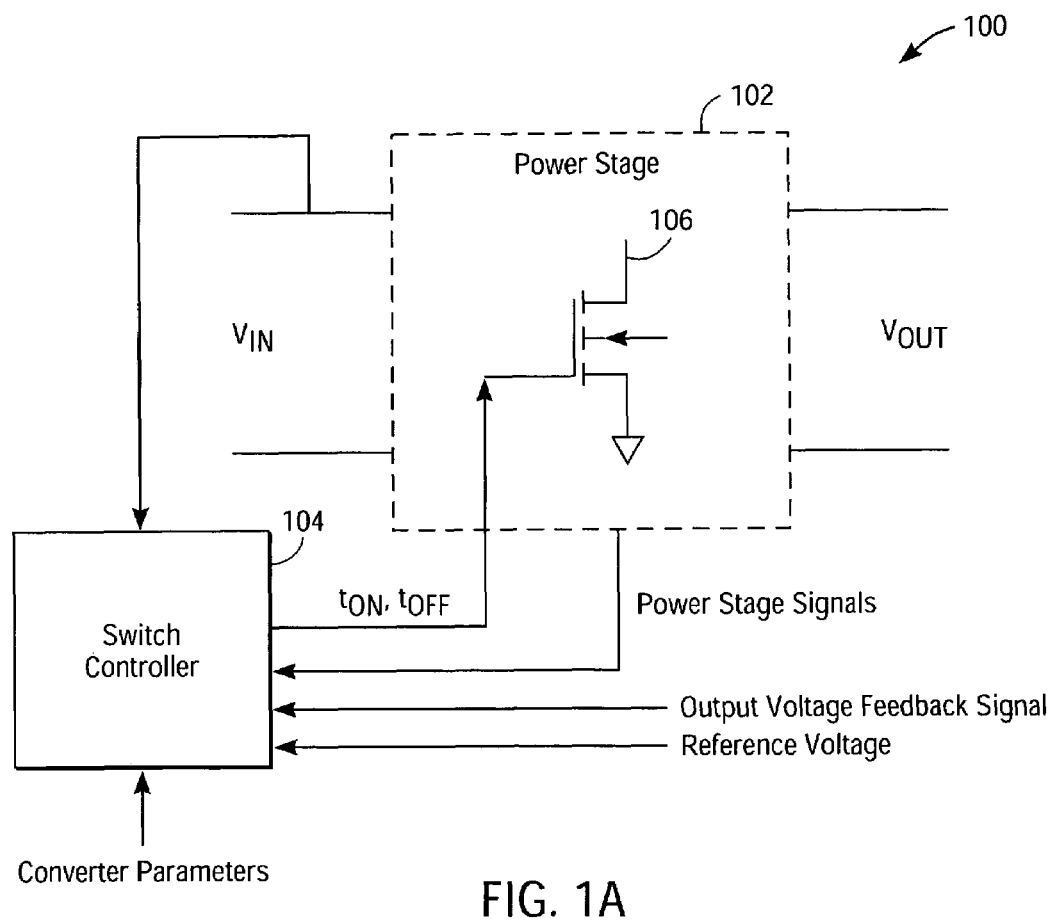
FIG. 1A is a diagram of a power converter according to one embodiment of the present invention.

The embodiments of the present invention will be described below with reference to the accompanying drawings. Like reference numerals are used for like elements in the accompanying drawings.

FIG. 1A is a diagram of the power converter 100 according to one embodiment of the present invention. The power converter 100 includes a power stage 102 and a switch controller 104. The power stage 102 receives full-wave rectified input voltage $V_{IN}$ from an electrical power source (not shown) and transfers them to a load (not shown) with an output voltage $V_{OUT}$ by turning the switch 106 on and off to couple the input voltage VIN to the output. The switch 106 is a conventional MOSFET switch but any other type of switch or number of switches may be used.

The switch controller 104 generates pulses to open or close the switch 106 so that the power stage 102 can deliver electrical power with a shaped input current and high power factor, e.g., 0.99 or more. In one embodiment, the switch controller 104 senses the input voltage $V_{IN}$ and determines operation modes of the power converter 100 based on the instantaneous value of the input voltage $V_{IN}$. The switch controller 104 also senses the output voltage feedback signal, a reference voltage, power converter parameters, and other power stage signals to maintain the output voltage $V_{OUT}$ at a desired level. Using these inputs, the switch controller 104 generates pulses for driving the switch 106 with on-times $t_{ON}$ and off-times $t_{OFF}$ that are generated in accordance with the determined operation mode, so that the input current is shaped to have the same waveform as that of the input voltage regardless of the input voltage level VIN. As such, the power stage 102 will deliver power to the load (not shown) according to the on-times and off-times determined by the operation mode, since the switch 106 is turned on only when the switch controller 104 generates an on-time for the pulse and is turned off when the switch controller 104 generates an off-time for the pulse.

The operation modes may include any two or more conventional types for driving power stages in power converters, such as Discontinuous Conduction Mode (DCM) or Critical Discontinuous Conduction Mode (CDCM), and they are selected to operate the power converter 100 depending upon the instantaneous value of the input voltage $V_{IN}$ such that a high power factor is maintained regardless of the input voltage level $V_{IN}$. In one embodiment, two operation modes are triggered according to the range of input voltage $V_{IN}$. In another embodiment, three operation modes are triggered according to the range of input voltage $V_{IN}$ and the range of the on-time of the switch 106. Yet in still another embodiment, three operation modes are triggered according to the range of input voltage $V_{IN}$ and the range of output current of the power converter 100. The operation modes will be explained in more detail hereinafter with reference to FIGS. 3A–3F.

Figure 1B:
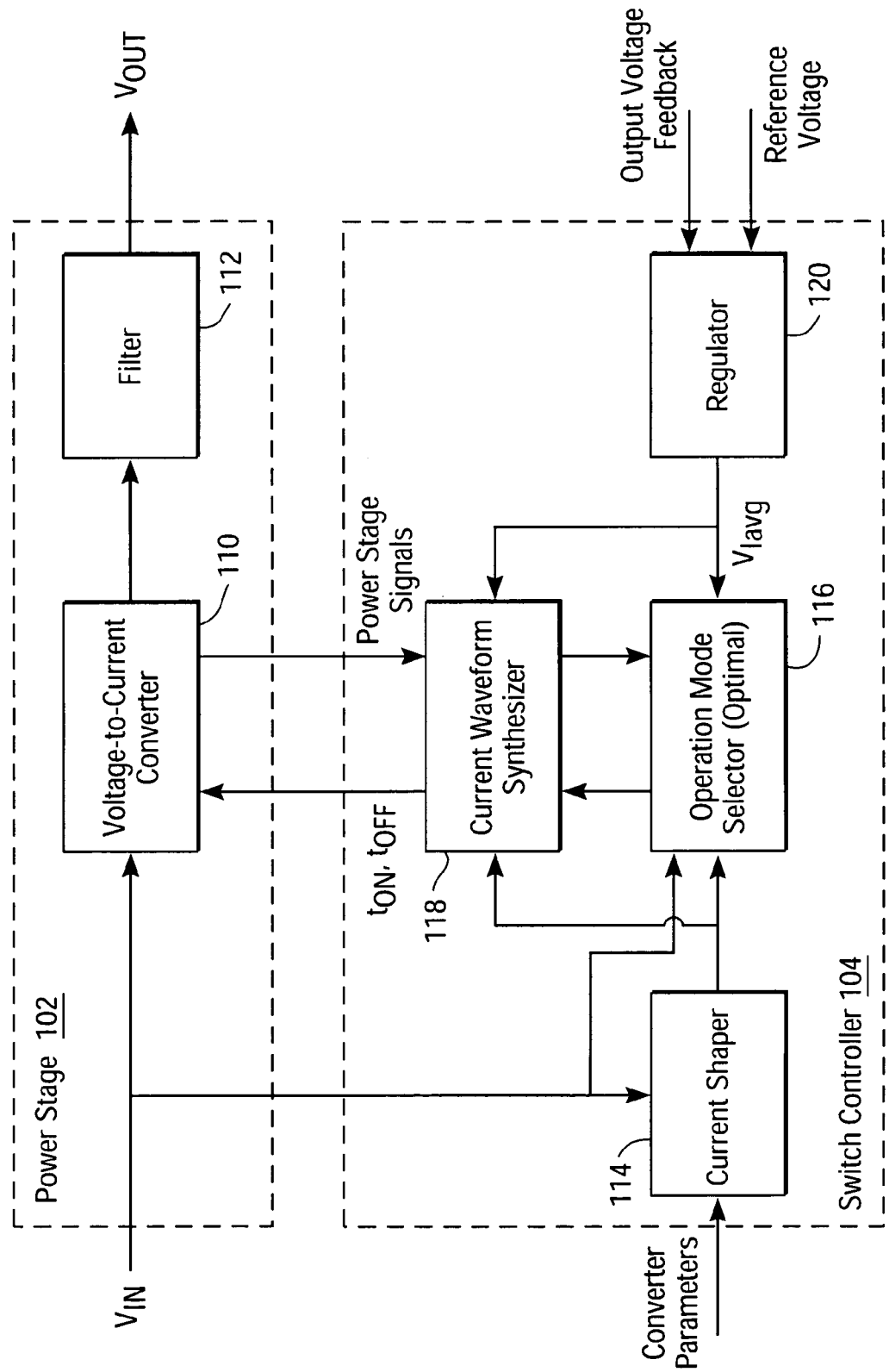
FIG. 1B is a block diagram of a power converter according to the embodiment of the present invention.

FIG. 1B is a block diagram illustrating the power converter 100 according to one embodiment of the present invention. The power converter 100 is capable of transferring power with an input current having a shaped waveform, by converting a full-wave rectified AC voltage VIN into a current source in an open loop configuration and regulating the output voltage $V_{OUT}$ to a reference voltage. The power converter includes a power stage 102 and a switch controller 104. The power stage 102 includes a voltage-to-current converter 110 and an output filter module 112, and the switch controller 104 includes a current shaper module 114, an operation mode selector module 116, a voltage regulator module 120, and a current waveform synthesizer module 118.

Referring to FIG. 1B, the voltage regulator module 120 tracks the output voltage feedback signal against the reference voltage, and generates a feedback control signal $V_{Iavg}$ for regulating the power converter 100. The feedback control signal $V_{Iavg}$ is generated to be proportional to the integral of the input current to the power converter 100, or any other power converter parameter proportional to the input current, over a predetermined period of time, regardless of the shape, form, and frequency of the input AC current. As such, the feedback control signal $V_{Iavg}$ may also be proportional to the output current (load). Besides generating the feedback control signal $V_{Iavg}$, the voltage regulator module 120 also detects sudden changes in the load and signals such changes to the current waveform synthesizer module 118.

The current shaper module 114 receives the full-wave rectified input voltage $V_{IN}$, and also receives power converter parameters including, among other things, the reference current shape waveform, the windings ratio of the transformer (not shown) used in the voltage-to-current converter module 110 in analog or digital form, and generates timing information and current waveform synthesis parameters required by the current waveform synthesizer module 118. The reference current shape waveform is typically synchronized with the rectified input voltage and has the same waveform as that of the input voltage. For example, if the reference current shape waveform were sinusoidal, the timing information would involve nothing more than synchronizing the input current waveform with the input voltage. If the reference current shape waveform were trapezoidal, the timing information would additionally mark the vertices of the trapezoidal waveform. The current shaper module 114 further provides inputs to the current waveform synthesizer module 118. According to the present invention, the current shaper module 114 may be programmed with any specific or arbitrary reference current waveform. Typically for an off-line AC-to-DC power converter, the reference current waveform would be synchronized with input voltage in the form of a rectified sinusoidal signal. As stated previously, a trapezoidal reference current waveform may also be used as will be explained below with reference to FIG. 7, which maintains high power factor at substantially lower peak current compared to that of a sinusoidal waveform. Some AC-to-DC power converter specific applications may require a specific input current waveform. Note that the present invention can be used to program any input current waveform to the power converter, according to the required specifications.

The operation mode selector 116 receives a scaled down version of the rectified input voltage signal $V_{IN}$ and the feedback control signal $V_{Iavg}$ from the voltage regulator module 120, selects the mode, appropriate to the sensed line voltage and load, and signals the current waveform synthesizer module 118. The signals to the current waveform synthesizer module 118 include events marking the transition of the rectified input voltage signal VIN from one input voltage range to another input voltage range, and the (input voltage dependent) upper bound of the output current range corresponding to light load, as well as information on the reference current shape waveform.

The current waveform synthesizer module 118 receives the timing information and the current waveform synthesis parameters from the current shaper module 114, the mode selection from the operation mode selector module 116, and the feedback control signal $V_{Iavg}$ from the voltage regulator module 120, and synthesizes in real time the desired current waveform by controlling the on-times ($t_{ON}$) and off times ($t_{OFF}$) of the switch 106 in the voltage-to-current converter 110.

Under certain operation modes, the waveform synthesis process may be facilitated by the availability of certain power stage signals from the voltage-to-current converter 110. For example, where the operation mode is CDCM and the power converter 100 is a flyback converter, the waveform synthesis is facilitated by the availability of power stage signals such as the voltage across the switch 106 or a voltage $V_{AUX}$ proportional to it measured from an auxiliary winding of the transformer (not shown) in the voltage-to-current converter module 110. In such case, the off-times ($t_{OFF}$) can be derived from the voltage $V_{AUX}$. The waveform synthesis process can also be similarly facilitated by the availability of other power stage signals such as the primary current measurement, Isense. The on-times ($t_{ON}$) can be derived by managing (limiting) the pulse-to-pulse values of peak primary current.

Figure 1C:
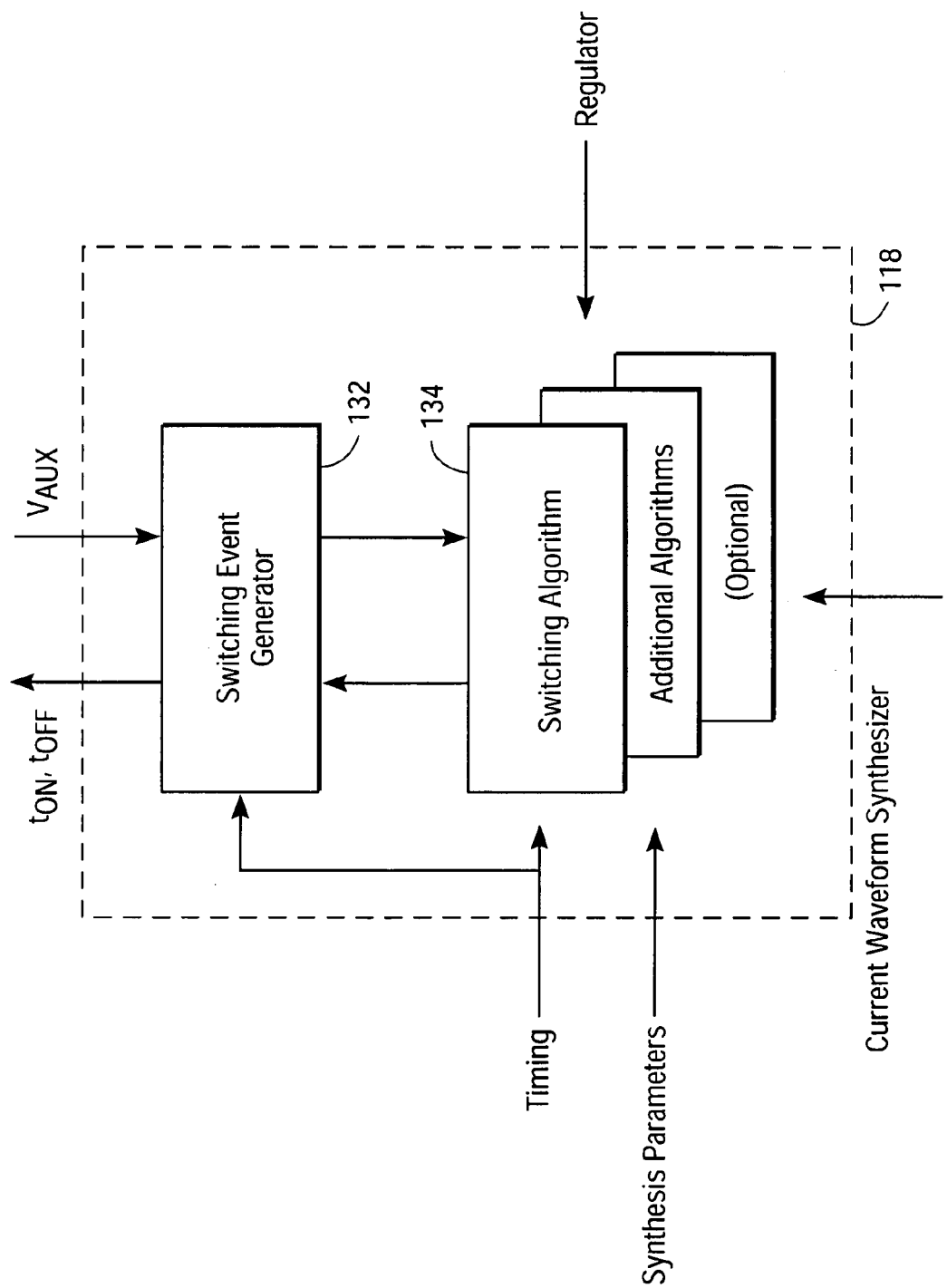
FIG. 1C is a block diagram illustrating a current waveform synthesizer according to one embodiment of the present invention.

FIG. 1C describes the current waveform synthesizer module 118 according to one embodiment of the present invention. Referring to FIG. 1C, the current waveform synthesizer module 118 includes a switching event generator module 132 and a plurality of switching algorithms 134 each corresponding to an operation mode. The switching event generator module 132 generates on-time events and off-time events to turn on and turn off the switch. Because these events may be generated internally (within the switching event generator module), they are likewise output to the switching algorithm modules 134 to facilitate the generation of subsequent switching events. The switching event generator module 132 processes power stage signals as well as inputs from the switching algorithm modules 134. An example of the power stage signal is the voltage signal $V_{AUX}$, which could be used to derive turn-off time. An example of an input from the switching algorithm module 134 would be a signal to enable/disable zero voltage switching (the derivation of off-time from the voltage $V_{AUX}$). Other examples of inputs to the switching event generator 132 output from the switching algorithm module 134 include on-time and off-time of the switch 106.

The switching algorithm modules 134, one for each operation mode, synthesize current waveforms by controlling, through the switching event generator 132, the on-times and off-times of the switch 106. Switching algorithms (modes) are selected by the operation mode selector module 116. The selected switching algorithm applies the timing and synthesis parameter inputs from the current shaper module 114 and the signal $V_{Iavg}$ from the output of the voltage regulator module 120 to realize, through the switching event generator module 132, the desired current waveform.

Figure 2A:
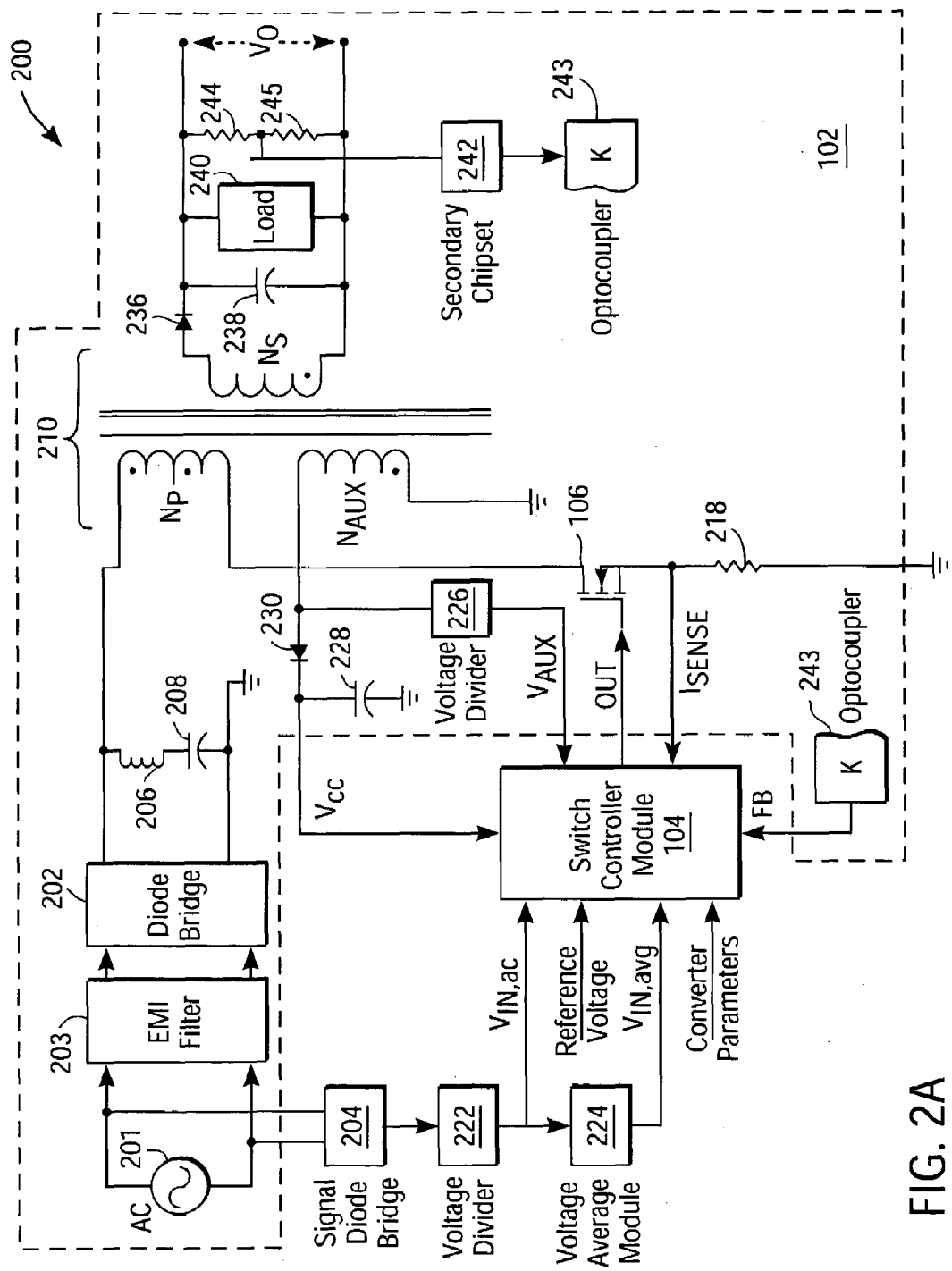
FIG. 2A is a diagram of a single-stage single-switch flyback power converter with input current shaping according to another embodiment of the present invention.

FIG. 2A is a diagram of a single-stage single-switch flyback power converter 200 with an output voltage feedback and sinusoidal shape of input current according to one embodiment of the present invention. The power converter 200 includes a power stage 102, a switch controller module 104, and other components such as a signal diode bridge 204, a voltage divider 222, and a voltage average module 224.

The power stage 102 includes an AC power source 201, a bridge diode rectifier 202, an EMI filter 203, an inductor 206 and a capacitor 208, a switching transformer 210 with primary winding $N_P$, secondary winding $N_S$, and auxiliary winding $N_{AUX}$. The power stage 102 further includes a switch 106, a resistor 218, a voltage divider 226, diodes 230, 236, and capacitors 228, 238. In operation, the power converter 200 is coupled to an AC power source 201 and transfers the electrical power to the load 240 through the transformer 210 when the switch 106 is turned off. The inductor 206 and capacitor 208 are a filter tuned to the second harmonic of the input voltage.

The diode bridges 202, 204 are conventional bridge diode rectifiers that rectify the AC voltage provided by the AC power source 201 to generate the rectified input voltage $V_{inrec}$. The rectified AC power is stored in the gap of the transformer 210 when the switch 106 is on and is transferred to the load 240 when the switch 106 is off, because the diode 236 is reverse biased when the switch 106 is on and forward biased when the switch 106 is off. The capacitor 238 provides the current to the load 240 when the switch 106 is turned on. The auxiliary winding $N_{AUX}$ powers the switch controller module 104 with operational voltage Vcc via diode 230 and capacitor 228. The voltage divider 222 receives the rectified AC input voltage $V_{inrec}$ and provides a scaled version ($V_{IN,ac}$) of the input voltage to the switch controller module 104. The voltage average module 224 receives the input voltage $V_{inrec}$ and generates an average input voltage $V_{IN,avg}$ to provide it to the switch controller module 220. The voltage divider 226 receives the output voltage at the auxiliary winding of the transformer 210 and provides the voltage signal $V_{AUX}$.

The switch controller module 104 receives the scaled AC input voltage ($V_{In,ac}$) (the scaled version of the input voltage $V_{inrec}$), the average input voltage ($V_{IN,avg}$), a reference voltage, other power converter parameters, a feedback voltage (FB), the current ($I_{SENSE}$) flowing through the switch 106, and Vcc (operational voltage of the switch controller 104) as its input signals. The switch controller module 104 uses these input signals to generate pulses with on-times ($t_{ON}$) and off-times ($t_{OFF}$) as its output signal for driving the switch 106. To this end, the switch controller module 104 senses the input voltage $V_{inrec}$ level (or the scaled AC input voltage ($V_{IN,ac}$) level) and determines the operation modes of the power converter 200 based on the input voltage $V_{inrec}$ level or the scaled AC input voltage ($V_{IN,ac}$) level. The switch controller module 104 also senses the current $I_{SENSE}$ on the switch 106, which may be used for protection of the power converter 200 and also for shaping input current when a peak current for each cycle is generated rather than on-times. The power converter 200 senses the feedback voltage (FB) for regulation of the output voltage provided to the load 240. The feedback signal FB is provided by resistive divider 244, 245, secondary chipset 242, and optocoupler 243. The signal diode bridge 204 is connected to the AC voltage source 201. The switch controller module 104 generates pulses for driving the switch 106 with on-times and off-times that vary depending upon the determined operation mode so that the input current is shaped to be sinusoidal (or other reference waveform shape) regardless of the input voltage $V_{inrec}$ level or the scaled AC input voltage ($V_{IN,ac}$) level while regulating the output voltage at a desired level. The switch controller module 104 may be implemented using analog or digital circuitry, as long as the functionalities described herein are implemented.

Figure 2B:
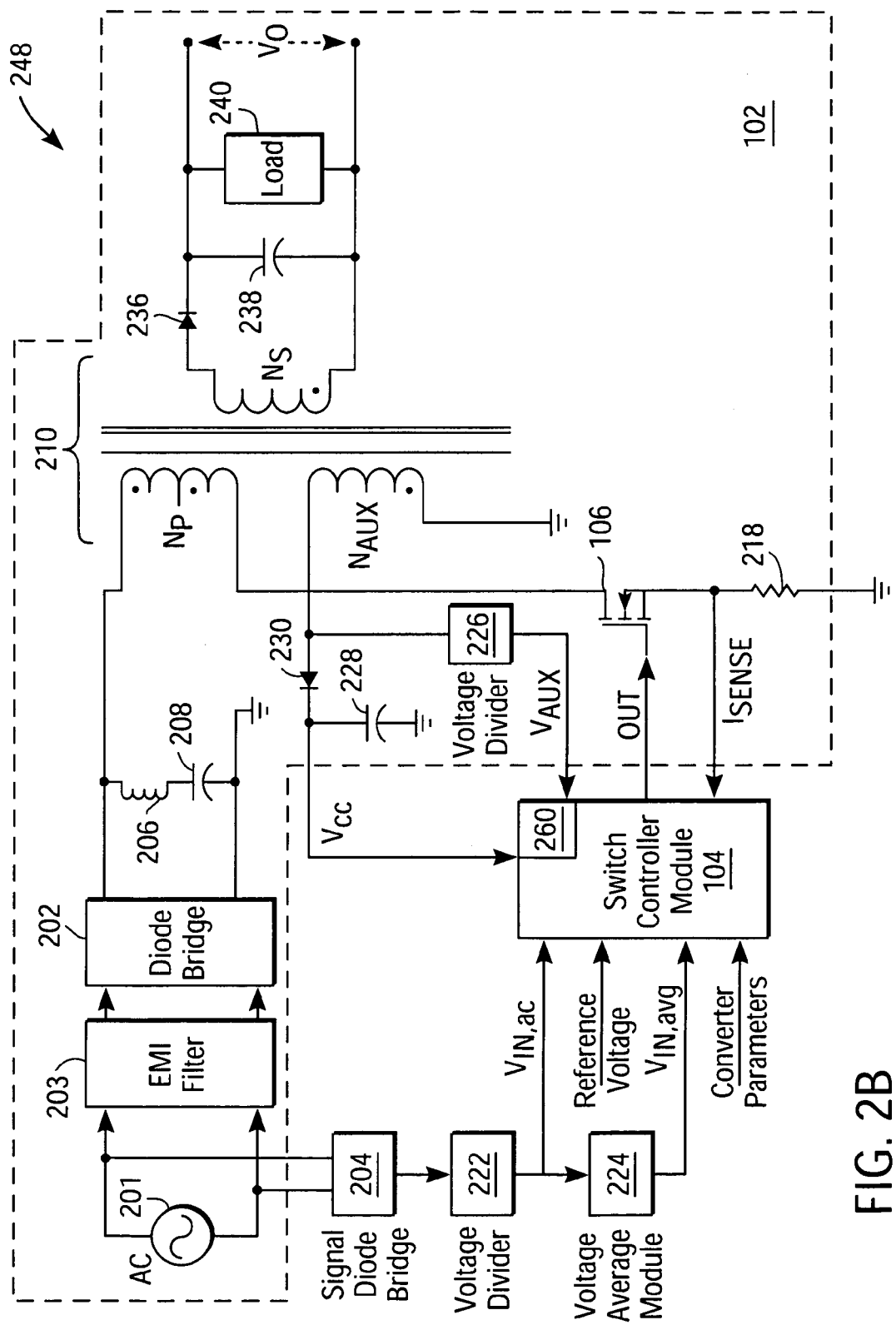
FIG. 2B is a diagram of a single-stage single-switch flyback power converter with input current shaping according to still another embodiment of the present invention.

FIG. 2B is a block diagram illustrating a single-stage, single-switch flyback power converter 248 using primary side-only feedback and programmed input current shape according to another embodiment of the present invention. The power converter 248 of FIG. 2B is identical to the power converter 248 of FIG. 2A except that the switch controller module 104 uses primary side-only control, thereby not receiving the feedback signal FB and not including the resistive dividers 244, 245, the secondary chipset 242, and the optocoupler 243.

Primary side-only control converters use feedback signals derived from either the drain voltage of the switch 106 or from a dedicated auxiliary winding $N_{AUX}$ as shown in FIG. 2B. The voltage $V_{AUX}$ derived from the auxiliary winding $N_{AUX}$ has a complex waveform pulse which at some specific times bears the information on the output voltage across the load 240. A feedback signal is extracted from the $V_{AUX}$ signal at these specific times (sampling times) in primary side-only control flyback power converters. For the purpose of input current shaping (power factor correction), the pulse-type feedback is not preferential, since the overall feedback loop should be in the low bandwidth (typically within 10–20 Hz) compared to input utility frequency. In order to support such feedback loop with such low bandwidth, a DC-type feedback signal is used.

Figure 2C:
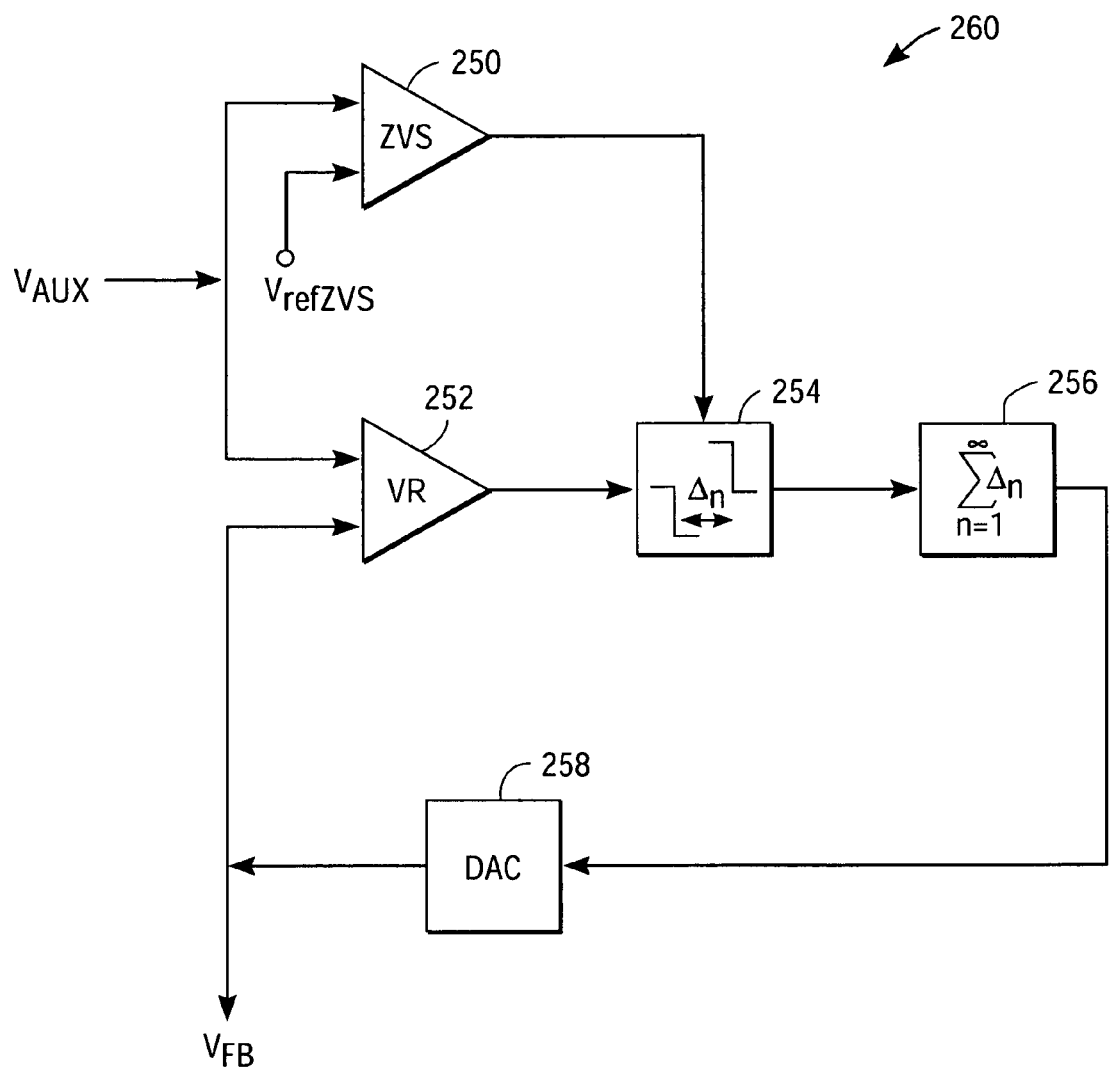
FIG. 2C is a block diagram of the feedback generator used in the power converter of FIG. 2B.

FIG. 2C is a block diagram illustrating a feedback signal generator 260 used for a primary side-control only power converter 248, according to one embodiment of the present invention. The feedback signal generator 260 is a part of the switch controller module 104. Referring to FIG. 2C, the $V_{AUX}$ signal is fed into the input terminals of a ZVS comparator 250 and a $V_R$ comparator 252. The ZVS comparator 250 has a constant reference $V_{ref,ZVS}$. A delta ($\Delta_n$) difference between the high to low edges of the comparators 250, 252 is determined in the sampling block 254. This delta ($\Delta_n$) difference is expressed in the form of n-cycles of system clocks. In the module 256, the sampling differences (errors) are summed (integrated), representing a DC feedback signal. A digital-to-analog (DAC) converter 258 converts the digital DC feedback signal to an analog feedback signal $V_{FB}$, which is also used as a reference in the $V_R$ comparator 252.

Except for the feedback signal generator 260 and the primary side-only feedback, the power converter 248 is identical to the power converter 200 of FIG. 2A and may be controlled with the same variety of operation modes. Note that power converter of the present invention may also be used with power converters other than single-switch single-stage flyback power converters.

Referring back to FIGS. 2A and 2B, the operation modes may include any conventional mode for driving switches in power converters, such as Discontinuous Conduction Mode (DCM) or Critical Discontinuous Conduction Mode (CDCM), and they are selected to operate the power converter 100 depending upon the input voltage $V_{inrec}$ level or the scaled AC input voltage ($V_{IN,ac}$) level or the load 240 such that the input current is shaped to the reference current shape waveform regardless of the input voltage $V_{inrec}$ level or the scaled AC input voltage ($V_{IN,ac}$) level while regulating the output voltage at a desired level. In one embodiment, the operation modes include three distinct modes triggered according to input voltage $V_{inrec}$ level and the level of the load or the range of on-time of the switch 106, as shown in FIGS. 3A–3F. The theory behind these operation modes will be explained hereinafter along with FIGS. 3A–3F.

Theory of Operation

A discontinuous conduction mode (DCM) flyback power converter, operated with an open loop at constant frequency and constant duty cycle, is known to deliver average AC input current. For a variable frequency and duty cycle in the DCM flyback power converter, the average input current $I_{aV}(i)$ to the power converter 202, 248 is:

$$I_{av}(i) = \frac{V_{inrec}(i)}{2L} \times D(i)^2 T_s(i) \tag{1}$$

where $V_{inrec}(i)$ is the instantaneous value of the input voltage to the power converter 200, 248 after being rectified by the bridge diode rectifier 202, L is the magnetizing inductance of the transformer 210, D(i) is the duty cycle of the signal driving the switch 106, and $T_S(i)$ is the switching period of one cycle of the signal driving the switch 106, where i represents that the input voltage varies with a low frequency, i.e., $V_{inrec}(i)=V_{in} \sin \omega t_i$. The duty cycle D(i) is further defined as:

$$t_{on}(i)/T_S(i)=t_{on}(i)/(t_{on}(i)+t_{off}(i)),$$

where $t_{on}(i)$ is the on-time of the switch 106 and $t_{off}(i)$ is the off-time of the switch 106.

The average output power $P_o$ delivered to the load 240 is:

$$P_o = \frac{V_{inrms}^2}{2L} \times \frac{1}{T_O} \int_{i}^{T_O} D(i)^2 T_s(i) dt_i \tag{2}$$

where $V_{inrms}^2$ is the root-mean-square value of the input voltage to the power converter 200 and $T_O$ is one-half of the low frequency cycle. For each switching cycle for a flyback power converter, $$i_{pp}(i) = \frac{V_{inrec}(i)}{L} \times t_{on}(i) \tag{3}$$

where $i_{pp}(i)$ is the peak primary current through the switch 106. Further, the balance of volt-seconds across the transformer 210 requires that:

$$V_{inrec}(i) \times t_{on}(i) = N \times V_o \times t_{off}(i) \tag{4}$$

where $N=N_P/N_S$. From equation (4), it follows that:

$$t_{off}(i) = t_{on}(i) \frac{V_{inrec}(i)}{N \times V_o}. \tag{5}$$

For CDCM, $$T_s(i) = t_{on}(i) + t_{off}(i) = t_{on}(i)\left(1 + \frac{V_{inrec}(i)}{N \times V_o}\right), \text{ or} \tag{5a}$$

$$\frac{T_s(i)}{t_{on}(i)} = 1 + \frac{V_{inrec}(i)}{N \times V_o}. \tag{6}$$

The average high frequency input current $i_{inav}(i)$ in the transformer 210 is:

$$i_{inav}(i) = \frac{i_{pp}(i)}{2} \times \frac{t_{on}(i)}{T_s(i)} \tag{7}$$

Substituting equation (3) into equation (7), $$i_{inav}(i) = \frac{V_{inrec}(i)}{2L} \times \frac{t_{on}(i)}{\frac{T_s(i)}{t_{on}(i)}} \tag{8}$$

Equation (8) can be expressed as:

$$i_{inav}(i) = \frac{V_{inrec}(i)}{2L} \times \frac{t_{on}(i)}{1 + \frac{V_{inrec}(i)}{N \times V_o}} \tag{9}$$

Since the inductance L is typically constant, and $V_{inrec}(i) = \sqrt{2} \times V_{inrms} \times \sin(\omega t_i)$, $\omega t=0..\pi$, in order to modulate $i_{inav}$ by a $\sin(\omega t_i)$ so that the current is in phase with the input voltage resulting in high power factor, it follows that $$\frac{t_{on}(i)}{1 + \frac{V_{inrec}(i)}{N \times V_o}}$$

should be constant:

$$\frac{t_{on}(i)}{1+\frac{V_{inrec}(i)}{N \times V_o}} = k, \qquad (10)$$

where k is constant and $$i_{inav}(i) = \frac{V_{inrec}(i)}{2L} k. \qquad (10a)$$

Therefore, the on time of the switch 106 is defined by:

$$t_{on}(i) = k\left(1 + \frac{V_{inrec}(i)}{N \times V_o}\right) = k + k_2 \times V_{inrec}(i) \qquad (11)$$

where $$k_2 = \frac{k}{N \times V_o}$$

and $N \times V_o$ is the converter parameters.

Accordingly, the switching period for the switch 106 can be derived as:

$$T_s(i) = \left(1 + \frac{\sqrt{2} \times V_{inrms} \times \sin(\omega t_i)}{N \times V_o}\right)^2 \times k \qquad (12)$$

and the variable duty cycle is:

$$D(i) = \frac{1}{1 + \frac{\sqrt{2} \times V_{inrms} \times \sin(\omega t_i)}{N \times V_o}} \qquad (13)$$

and the average output power will be defined by substituting $T_s(i)$ and $D(i)$ from equations (12) and (13), respectively, into equation (2):

$$P = \frac{V_{inrms}^2}{2L} \times k \qquad (14)$$

From equations (11), (13) and (14), it follows that it is possible to modulate the average input current by an input sin (ωt) or have close to unity power factor while maintaining a variable $t_{ON}$ time and $T_S$ time according to equations (11) and (13) with noticeable improvement over the conventional constant frequency and constant duty cycle mode. Equations (11) and (13) were derived using the reset condition of equation (5a) for the transformer 210. This means that a power converter running with $t_{ON}$ time and $T_S$ cycle time according to the equations (11) and (13) will maintain a critical discontinuous conduction mode. Thus, the power converter is operated to generate sinusoidal input current, regulate output voltage, and maintain CDCM that is most beneficial for efficiency. Coefficient k in equation (10) is a parameter which sets the amplitude of the input current in equation (10a) or the output power in equation (14). In a closed loop system such as that shown in FIG. 1B, the output signal $V_{Iavg}$ of the voltage regulator module 120 is directly proportional to the coefficient k, effectively changing the amplitude of the input current due to changes either at the input or the output of the power converter 100.

Evaluating $t_{ON}(i)$ in equation (11) and $T_S(i)$ in equation (12), it is evident that, when $\sin(\omega t_i) \to 0$, $t_{ON}(i) \to k$ and $T_S(i) \to k$, or $t_{ON}(i) \to T_S(i)$ and $t_{OFF}(i) \to 0$, creating a practical problem in running the power converter with the off-times of the switch 106 close to zero. Such consideration brings a practical limit to equations (10) and (12). At some point of low voltage $V_{inrec}(i)$, the power converter should be switched to another mode of operation other than what is given by equations (10) and (12). In order to avoid this situation, the operation modes of the switch controller 104 are divided into at least two modes depending upon the level of the input voltage and its architecture is designed to be adaptable for operation in the different modes.

Figure 3A:
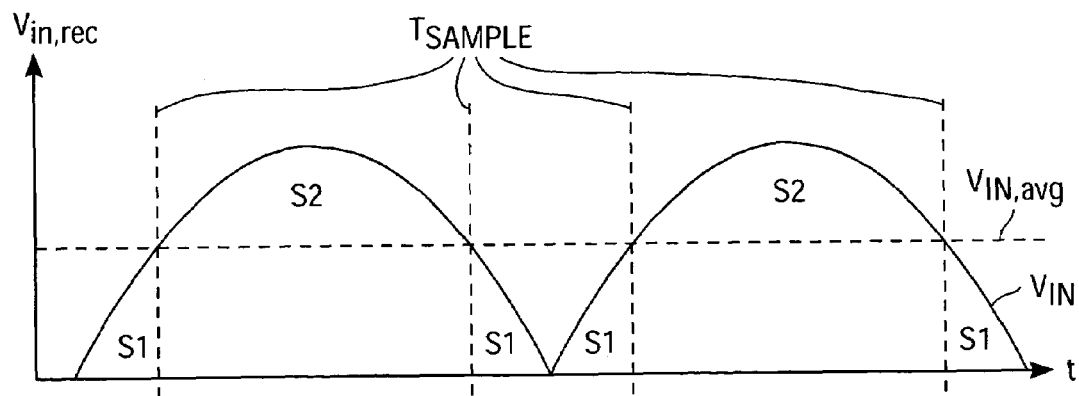
FIG. 3A is a graph showing two operation modes of the power converter shown in FIG. 2.

FIG. 3A is a graph showing the two operational modes for the power converter 200, 248. FIG. 3A shows the ranges of full-wave rectified input voltage $V_{inrec}(i)$ (also referred to as $V_{IN,ac}$ herein) corresponding to two modes of operation, modes S1 and S2. As shown in FIG. 3A, the input voltage $V_{inrec}(i)$ has a sinusoidal shape. In S2 mode, the power stage 102 operates in critical discontinuous conduction mode, with variable on-times and off-times for the switch 106 according to Equations (11) and (12). In S1 mode, the power stage 102 operates in discontinuous conduction mode by driving the switch 106 such that $T_S(i)$ is constant (constant frequency) and $D(i)$ is also constant (constant on-time $t_{ON}$ of the switch 106).

The transition between the S1 and S2 modes may be selected at any instantaneous value of the input voltage $V_{inrec}(i)$. Regardless of how long the power converter 100 operates in either S1 or S2 mode, the same power over the input voltage cycle, the same average current, and the same power factor will be delivered. In order to assure the continuity of the power processing as stated above in S1 mode, the duty cycle $D_{S1}$ and period $T_{S1}$ in S1 mode is set such that:

$$D_{S1}^2 \times T_{S1} = k \qquad (15),$$

where k is a coefficient determined by the regulator 120 by maintaining $t_{ON}(i)$ and $T_S(i)$ in the S2 mode within the same half cycle of input utility frequency. According to the present invention, the validity of equation (15) may be supported by selecting $D_{S1}$ ($t_{ON,S1}$) and $T_{S1}$ to be equal to the last values of $t_{ON}(i)$ and $T_S(i)$, respectively, in the immediately preceding switching cycle in S2 mode. Therefore, the transition between S1 and S2 modes may occur at any value of $V_{inrec}(i)$ greater than a very low threshold voltage. For simplicity of the power regulator, in one embodiment of the present invention, the transition point between the S1 and S2 modes is selected to be the average input voltage $V_{IN,avg}$, such that the power converter is in S1 mode when input voltage $V_{inrec}(i)$ less than $V_{IN,avg}$, and in the S2 mode when the input voltage $V_{inrec}(i)$ is larger than $V_{IN,avg}$. In this case, the transition between the S1 and S2 modes occurs at the same relative value of the sinusoidal input voltage regardless of its amplitude.

Figure 3B:
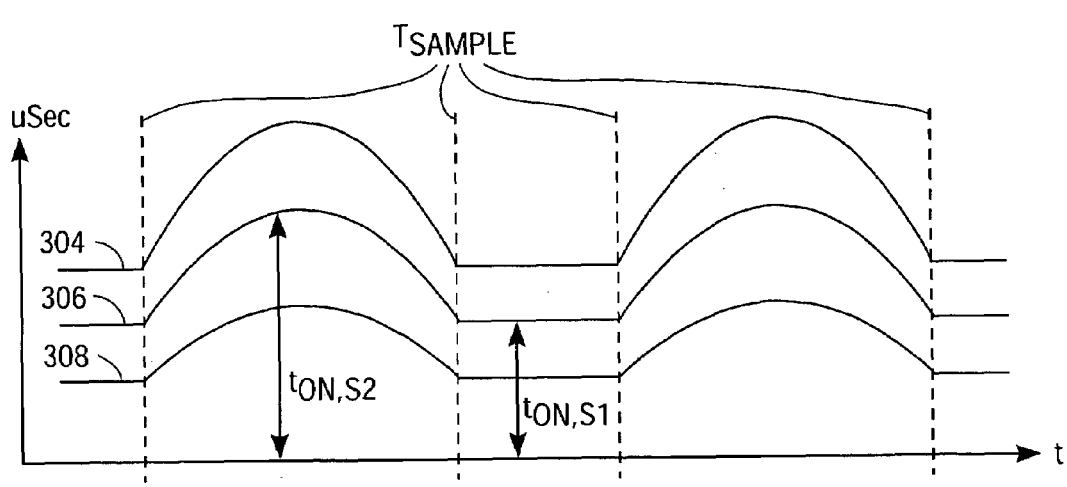
FIG. 3B is a graph showing the on-times ($t_{ON,S1/S2}$) of the switch when the power converter is in the S1 or S2 mode.
Figure 3C:
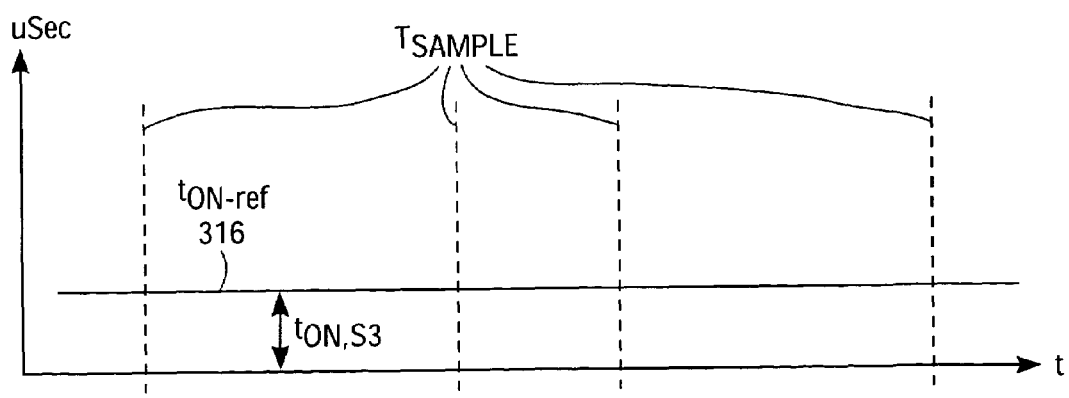
FIG. 3C is a graph illustrating the on-times ($t_{ON,S3}$) for the switch when the power converter is in the S3 mode.

FIG. 3B is a graph showing the on-times ($t_{ON,S1/S2}$) of the switch 106 when the power converter 200, 248 is in either the S1 mode or S2 mode, and FIG. 3C is a graph illustrating the on-times ($t_{ON,S3}$) of the switch 106 when the power converter is in the S3 mode. Referring to FIG. 3B, it is shown that the on-times ($t_{ON,S1/S2}$) are constant when the power converter 200 is in S1 mode ($V_{inrec}(i)$ is less than $V_{IN,avg}$) and is modulated when the power converter 200, 248 is in S2 mode ($V_{inrec}(i)$ is higher than $V_{IN,avg}$). In S2 mode, the power converter 200, 248 operates with: {PARA0}

$$t_{on}(i) = k\left(1 + \frac{V_{inrec}(i)}{N \times V_o}\right) \quad (16a)$$

$$D(i)^2 T_S(i) = k \quad (16b).$$

In S1 mode, the constant on-time is defined by:

$$t_{ON} = k\left(1 + \frac{V_{S1/S2}}{NV_O}\right), \quad (17)$$

where $V_{S1/S2} = V_{IN,avg}$ at the transition point between the S1 and S2 modes. In both S1 and S2 modes, the coefficient k in equations (16a), (16b), and (17) is variable and proportional to the load 240. The different variations 304, 306, 308 of on-times ($t_{ON,S1/S2}$) correspond to a different level of load 240. The smaller the load 240 is (i.e., the higher the impedance of the load 240 is), the smaller the on-times ($t_{ON,S1/S2}$) are.

The S3 mode is used in the power converter 200, 248 to address another application problem that can be seen from equation (11). At low loads (high impedance loads that draw only a little current) that result in low on-times for the switch 106, it becomes impractical to maintain high power factors. As such, the optimal mode of operation of the power stage 102 is pulse frequency modulation with constant on-time $t_{ON,S3}$. To this end, the on-times ($t_{ON,S1/S2}$) are sampled at the transition point between S1 and S2, and at a certain value of the load when $t_{ON,S1}$ 304, 306, 308 becomes equal to a threshold on-time $t_{ON-REF}$, the power converter 200 transitions to the third mode, S3 mode. Thus, $t_{ON,S3}$ is constant at full low frequency cycle as shown by a straight line in FIG. 3C. As shown in FIG. 3C, the switch controller 104 keeps the on-time $t_{ON,S3}$ constant (for each RMS value of input voltage $V_{inrec}(i)$) and modulates the off-time $t_{OFF,S3}$ to maintain the output voltage of the power converter 200, 248 constant.

The minimum threshold on-time $t_{ON-REF}$ is selected for system optimization, such as voltage regulation optimization or frequency optimization. For example, in the power converter 248 of the present invention, the minimum threshold on-time $t_{ON-REF}$ is selected to be a value that would ensure that the power converter 248 operates with primary side-only control of the output voltage.

FIG. 3D is a table showing the matrix of operation modes of the power converter 200, 248 according to one embodiment of the present invention. FIG. 3D shows not only different control of on-times and off-times according to the S1, S2, and S3 modes, but also shows different adjustments of on-times and off-times according to the steady state and the transient state. The on-time and off-time parameters generated in the S1, S2, and S3 modes described above are functions of the RMS or average value of the input voltage $V_{inrec}(i)$, the output load 240, and the instantaneous value of the input voltage $V_{inrec}(i)$. In the switch controller module 104, the RMS value of the input voltage $V_{inrec}(i)$ and the output load 240 value are subsequently converted into a control voltage $V_{Iavg}$ as will be explained below with reference to FIGS. 4A and 4C. The control voltage $V_{Iavg}$ is a relatively slow signal that corresponds to the output of the regulator module 120 shown in FIGS. 4A and 4C. Steady state in FIG. 3D, refers to dependence of on-times and off-times upon the instantaneous input voltage $V_{inrec}(i)$ at a fixed value of the control voltage $V_{Iavg}$. Transient state in FIG. 3D refers to adjusting the on-times and off-times so that they correspond to changes of the control voltage $V_{Iavg}$.

Referring to FIG. 3D, in the S1 mode, the turn-on times ($t_{ON}$) and the turn-off times ($t_{OFF}$) of the switch 106 are fixed in the steady state and adjusted to fixed values corresponding to the RMS or average value of the input voltage $V_{inrec}(i)$ and output current in the transient state. As a result, in the S1 mode the power converter 200, 248 operates in the range of DCM to CDCM. In the S2 mode, the turn-on times ($t_{ON}$) of the switch 106 are modulated in the steady state and adjusted to scale up or down the modulated on-time values in the transient state, while the turn-off times ($t_{OFF}$) of the switch 106 are determined by whatever turn-off time is required under CDCM both in the steady and transient states. As a result, in the S2 mode the power converter 200, 248 operates in the CDCM.

In one embodiment, the S3 mode applies when the on-times ($t_{ON,S1/S2}$), measured when $V_{inrec}(i)$ equals $V_{IN,avg}$, becomes equal to the minimum threshold on-time $t_{ON-REF}$. In S3 mode, the on-time and the off-time are fixed in the steady state, the on-time is adjusted to fixed values corresponding to the RMS or average value of the input voltage $V_{inrec}(i)$ in the transient state, and the off-time is determined by pulse frequency modulation in the transient state. As a result, in S3 mode the power converter 200, 248 operates in DCM with the on-times of the switches being dependent upon the load.

Figure 3E:
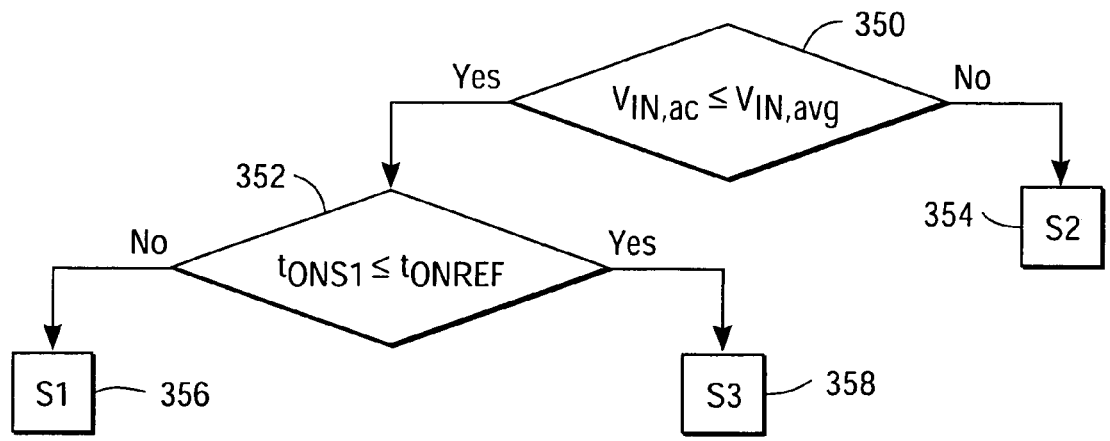
FIG. 3E is a flow chart illustrating the selection of operation modes based upon input voltage.
Figure 3F:
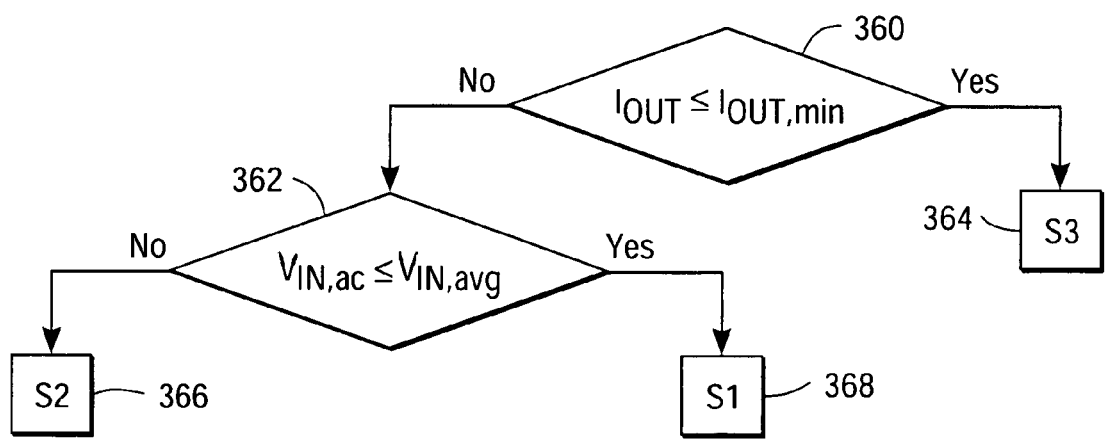
FIG. 3F is a flow chart illustrating the selection of operation modes based upon output current.

FIG. 3E is a flow chart illustrating the selection of operation modes described in FIG. 3D based upon input voltage according to one embodiment of the present invention, and FIG. 3F is a flow chart illustrating the selection of operation modes described in FIG. 3D based upon output current according to another embodiment of the present invention. In FIGS. 3E and 3F, it is shown that certain input criteria are used to trigger a particular operation mode. The same mode may be triggered by different conditions.

In FIG. 3E, the input criteria are the instantaneous input voltage of the power converter 200, 248 and the on-time of the switch 106 generated at the transition point from S2 mode to S1 mode. Referring to FIG. 3E, it is determined 350 whether $V_{IN,ac} \leq V_{IN,avg}$. If not, the S2 mode is triggered 354. If so, then it is further determined 352 whether the on-times of the switch 106 generated at the transition point from S2 mode to S1 mode is less than the minimum on-time, i.e., $t_{ON,S1} \leq t_{ON-REF}$. If so, S3 mode is triggered 358. If not, S1 mode is triggered 356.

In FIG. 3F, the input criteria are the instantaneous input voltage of the power converter 200, 248 and the output current. That is, an output current is compared with predetermined minimum value to select either S1/S2 modes or S3 mode. As will be explained below with reference to FIGS. 4A and 4C, for converter 200, 248 with the feed-forward voltage $V_F$, the output $V_{Iavg}$ of regulator 120 is proportional to the output current and thus can be used for the mode selection described in FIG. 3F without actually measuring the output current. Referring to FIG. 3F, it is determined 360 whether $I_{OUT} \leq I_{OUT,min}$. If yes, the S3 mode is triggered 364. If not, then it is further determined 362 whether $V_{IN,ac} \leq V_{IN,avg}$. If so, S1 mode is triggered 368. If not, S2 mode is triggered 366.

Figure 4A:
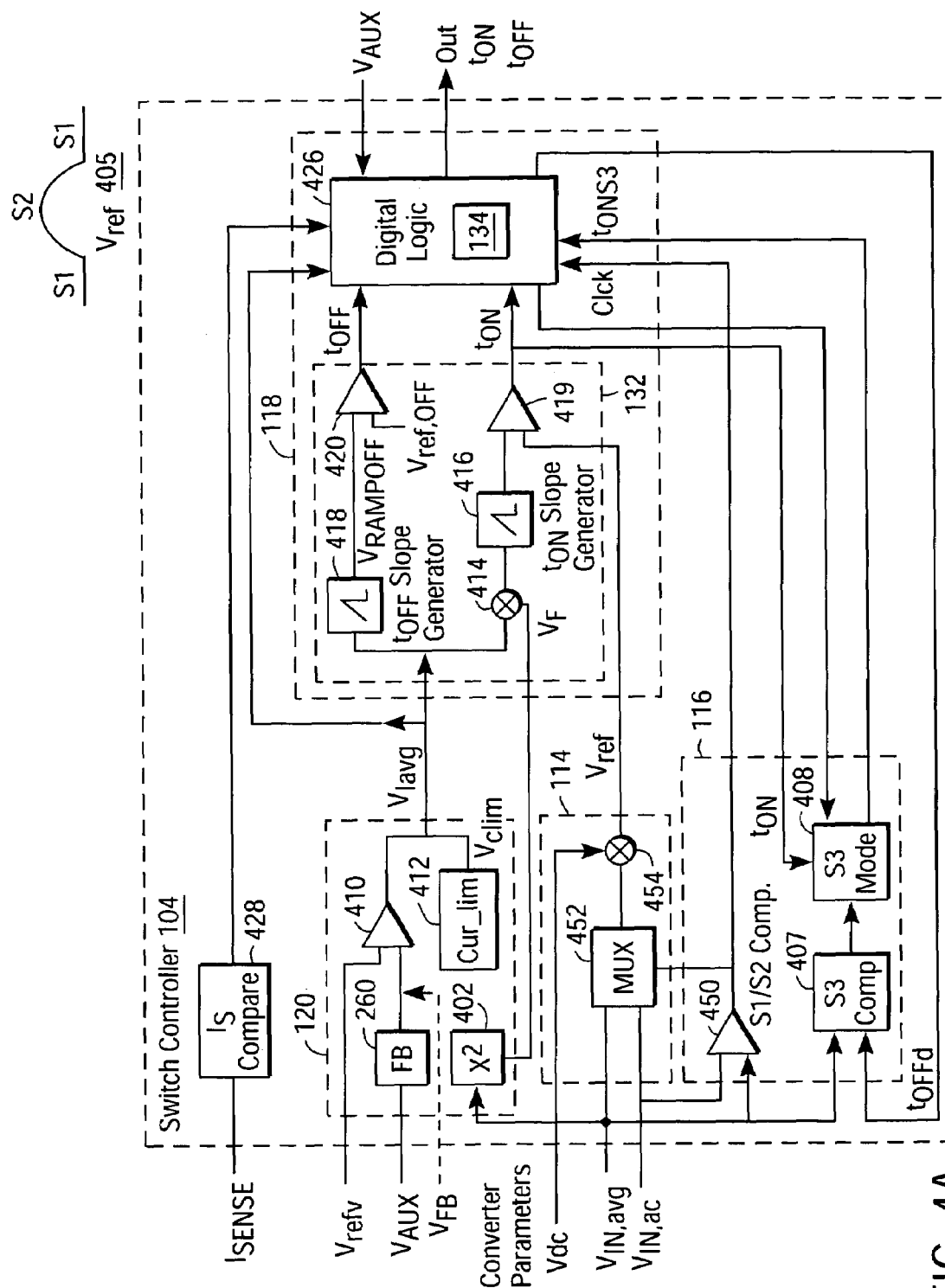
FIG. 4A is a block diagram illustrating the switch controller module of the flyback power converter shown in FIG. 2B according to one embodiment of the present invention.
Figure 4B:
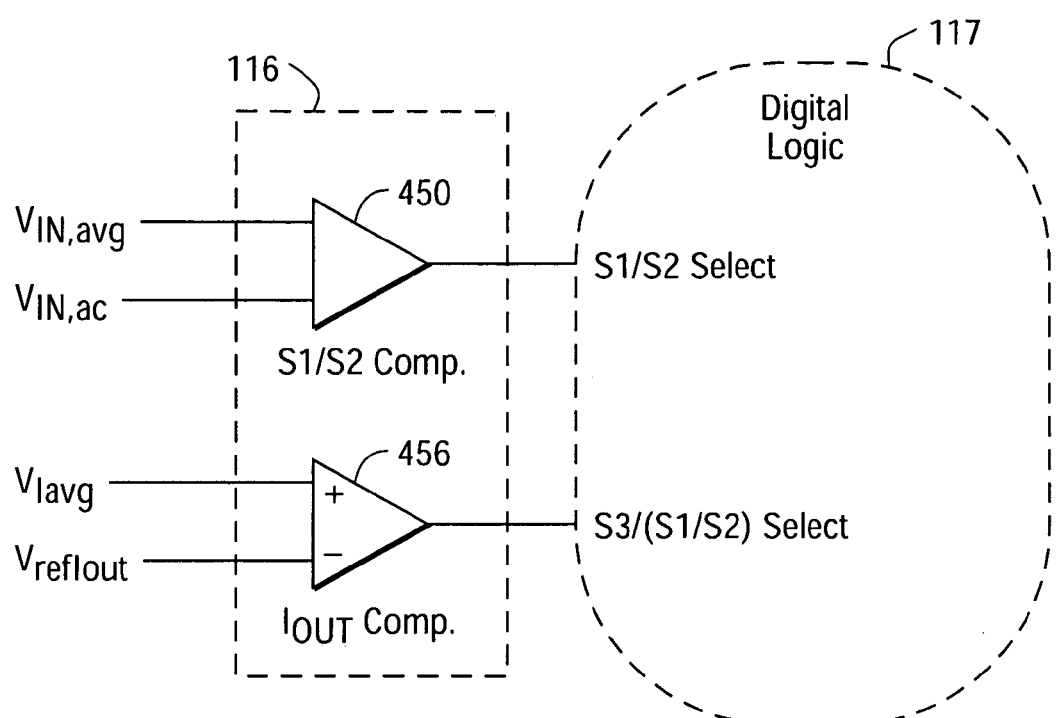
FIG. 4B is a block diagram illustrating the operation mode selector based on output current used in FIG. 4A, according to one embodiment of the present invention.

FIG. 4A is a block diagram illustrating the switch controller module 104 of the flyback power converter 200, 248 according to one embodiment of the present invention. The switch controller module 104 includes an Isense comparator 428, a regulator 120, a current shaper 114, an operation mode selector 116, and a current waveform synthesizer 118. The regulator 120 is comprised of a squared voltage generator module 402, a feedback generator 260 (only for converter 248), an error amplifier 410, and a current limit signal generator 412. The current shaper 114 includes a multiplexer 452 and an adder 454. The operation mode selector 116 includes an S1/S2 comparator 450, an S3 comparator 407, and an S3 mode selector 408 to implement mode selection according to the method described in FIG. 3E. Alternatively, the operation mode selector 116 may be implemented as shown in FIG. 4B to implement mode selection according to the method described in FIG. 3F. In the operation mode selector 116 of FIG. 4B, the S1/S2 comparator 450 compares the $V_{IN,avg}$ and the $V_{IN,ac}$ and the Iout comparator 456 compares $V_{Iavg}$ with the value $V_{ref,Iout}$ corresponding to the minimum output current to implement the mode selection according to the method described in FIG. 3F.

The current waveform synthesizer 118 is comprised of an adder 414, $T_{ON}$ slope generator 416, $T_{OFF}$ slope generator 418, $T_{ON}$ comparator 419, $T_{OFF}$ comparator 420, and digital logic 426.

The squared voltage generator module 402 receives the average input voltage $V_{IN,avg}$ from the voltage average module 224 and generates a feed-forward voltage $V_F$, which is a squared value of the average input voltage $V_{IN,avg}$. The feed-forward voltage is used in the regulator 120 to offset changes in the input AC voltage.

Figure 4C:
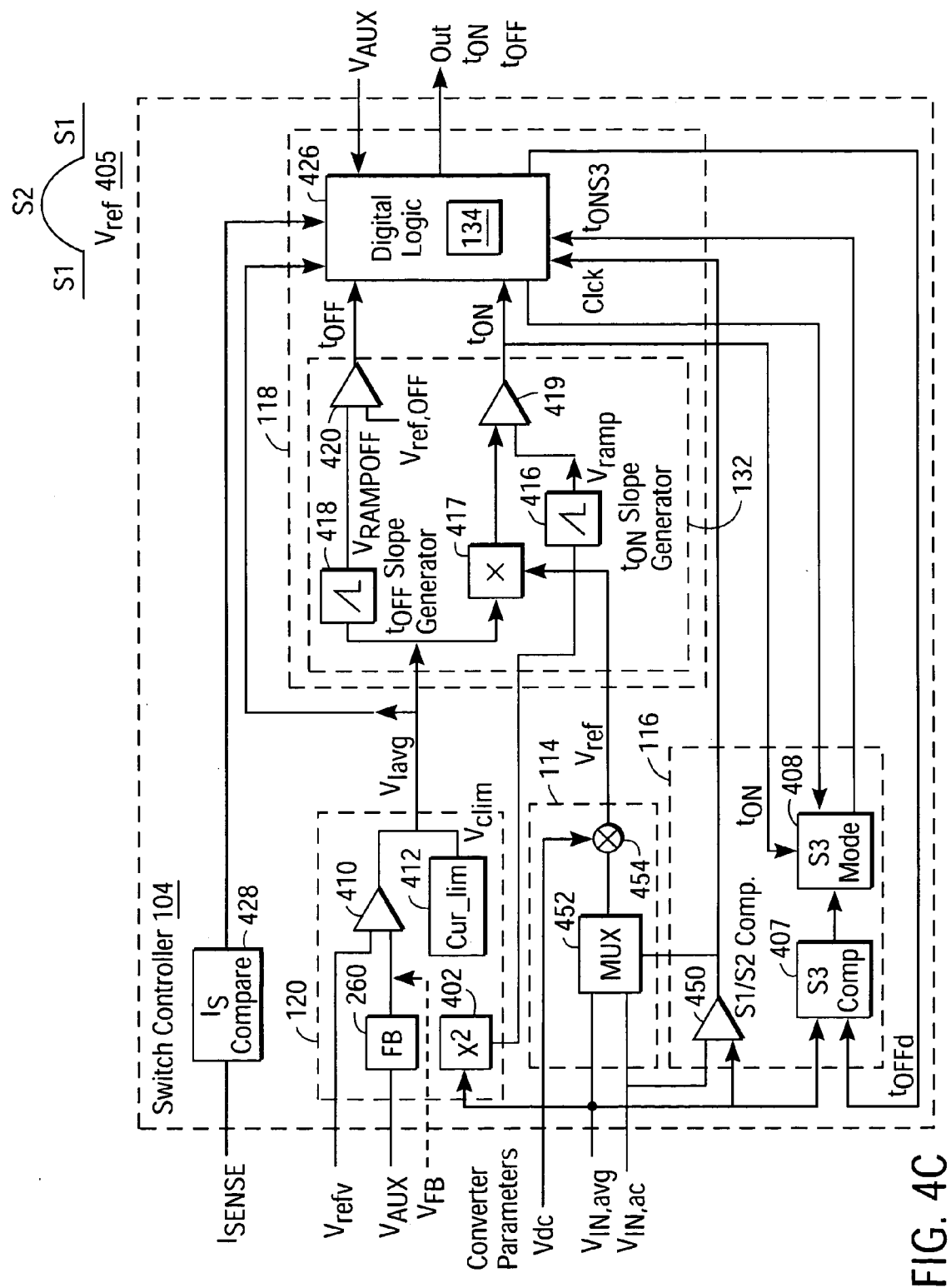
FIG. 4C is a block diagram illustrating the switch controller module of the flyback power converter shown in FIG. 2B according to another embodiment of the present invention.
Figure 4D:
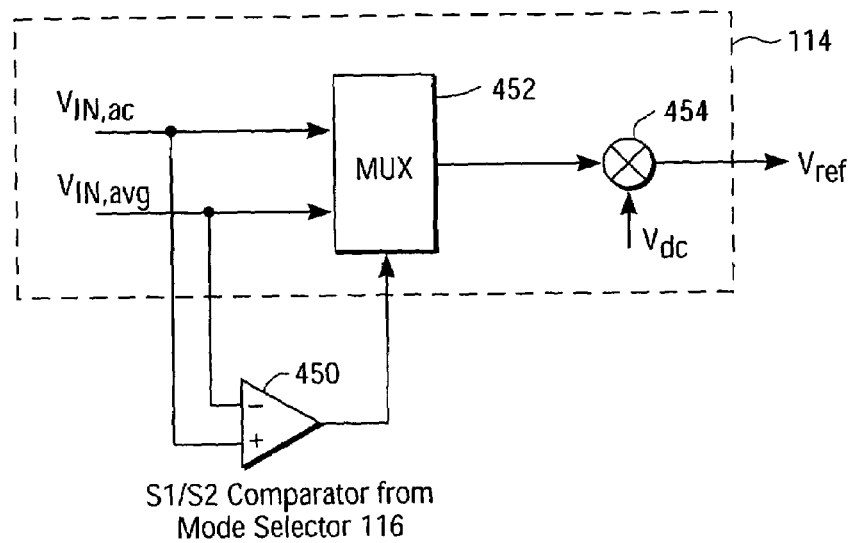
FIG. 4D is a bock diagram illustrating the reference signal generator module shown in FIGS. 4A and 4C in more detail.
Figure 4E:
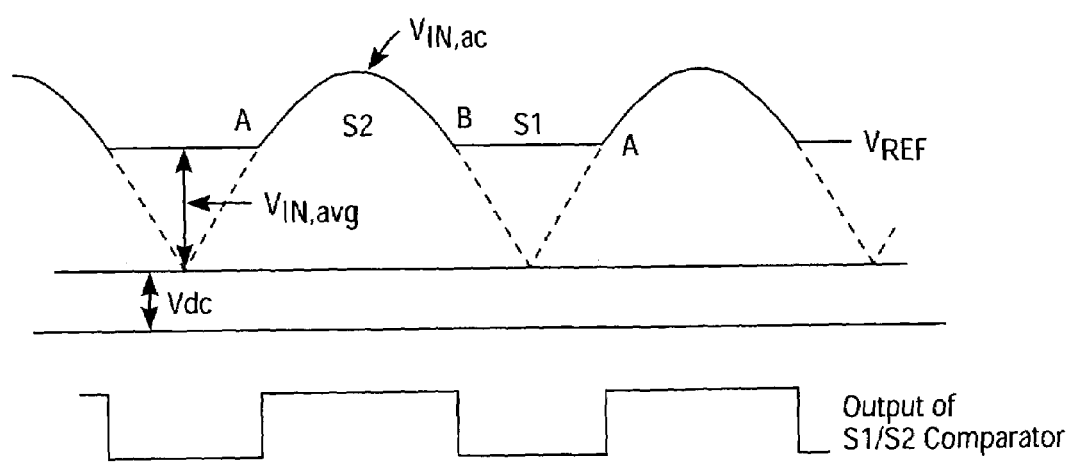
FIG. 4E is a diagram illustrating the reference voltage signal output from the reference signal generator module.

FIG. 4D is a block diagram illustrating the current shaper module 114 shown in FIGS. 4A and 4C in more detail. Referring to FIG. 4C, the current shaper module 114 includes a multiplexer 452 and an adder 454. The reference current shape waveform signal is generated in the current shaper 114. The multiplexer 452 is coupled to the receive the average input voltage signal $V_{IN,avg}$ from the voltage average module 224 and the scaled input voltage signal $V_{IN,ac}$ from the voltage divider 222. The S1/S2 comparator 450 in the mode selector 116 outputs a high signal when $V_{IN,ac} > V_{IN,avg}$ (S2 mode) and a low signal when $V_{IN,ac} < V_{IN,avg}$ (S1 mode). Accordingly, the multiplexer 452 outputs $V_{IN,ac}$ in S2 mode and $V_{IN,avg}$ in S1 mode. The adder 454 adds a bias DC voltage signal $V_{dc}$ proportional to $N \times V_o$ to the output of the multiplexer 452 to generate the reference signal $V_{REF}$ 405 according to equations (10) through (13). When the S1/S2 comparator 450 is high, it sets the multiplexer 452 in the status when $V_{IN,ac}$ signal is at its output. The resulting reference voltage signal $V_{REF}$ 405 output by the current shaper module 114 and the output of the S1/S2 comparator 450 are illustrated in FIG. 4E. In order to implement Equation (11) to generate on-times ton (i), the reference signal $V_{REF}$ signal includes the signal component $V_{dc}$ that is proportional to and a scaled down version of the output voltage Vo (for regulation of output voltage) and $V_{IN,ac}$ that is proportional to and a scaled down version of the input voltage $V_{IN,ac}$ (for current shaping and power factor correction).

Referring back to FIG. 4A, the error amplifier 410 determines a difference between the output feedback voltage $V_{FB}$ and the reference voltage $V_{ref}$, and generates a control voltage $V_{Iavg}$. The control voltage $V_{Iavg}$ is limited to a predetermined value $V_{cllim}$ by the current limit signal generator 412. The on-time control adder 414 adds the control voltage $V_{Iavg}$ to the feed-forward voltage $V_F$. In S2 mode, the $T_{on}$ slope generator module 416 generates a ramp using the control voltage $V_{Iavg}$ (equal to k in Equation (11)), which is then compared with the reference voltage signal $V_{ref}$. As a result, on-time $t_{ON}$ is generated, which is followed by an off-time $t_{OFF}$ controlled by a digital logic 426 that fixes the off-time $t_{OFF}$ equal to transformer 210 reset time. The digital logic module 426 receives the signal $V_{AUX}$ from the auxiliary winding (having $N_{aux}$ turns) of the transformer 210. The $V_{AUX}$ signal contains information about flux in the transformer 210. The digital logic module 426 determines the moment when the flux is equal to zero (or end of transformer reset), allows time to complete a half resonant cycle of the transformer 210, and then generates a signal for starting the new switching cycle (or effectively identifies the off-time).

The power converter 200, 248 runs in discontinuous conduction mode, and $D(i)^2 \times T_S(i) = k$ is kept constant to assure shaping of an average input sinusoidal current and a power factor equal to 1. In the S2 mode, the power converter 200, 248 operates with variable on-time, variable off-time and variable frequency. The highest value of on-time and off-time in the S2 mode occur at the crest of $V_{IN,ac}$. At this point, the frequency reaches its minimum value.

Referring back to FIGS. 4D and 4E, in S1 mode at the transition points B determined by the S1/S2 comparator 450, the multiplexer 452 switches the reference voltage signal $V_{ref}$ to be a constant voltage equal to $V_{ref} = V_{dc} + V_{IN,avg}$. In S1 mode, the power converter 200, 248 operates with the constant on-time as it was developed at the last switching cycle of the S2 mode. In S1 mode, the power converter 200, 248 also operates with the constant off-time equal to the transformer reset time of the immediately preceding switching cycle in mode S2. In S1 mode, the product $D(i)^2 T_S(i)$ is still equal to k in Equation (11) but both D(i) and $T_S(i)$ are fixed and the power converter continues to shape the sinusoidal form of the input current and maintain unity power factor. Unlike the S2 mode, in the S1 mode the average input current is modulated by the input sinusoidal voltage $V_{IN,ac}$ by keeping the on-time and the switching frequency constant. In the S1 mode, the power converter 200, 248 operates in the discontinuous conduction mode, with the off-time of the switch 106 always being larger than transformer 210 reset time.

Figure 4F:
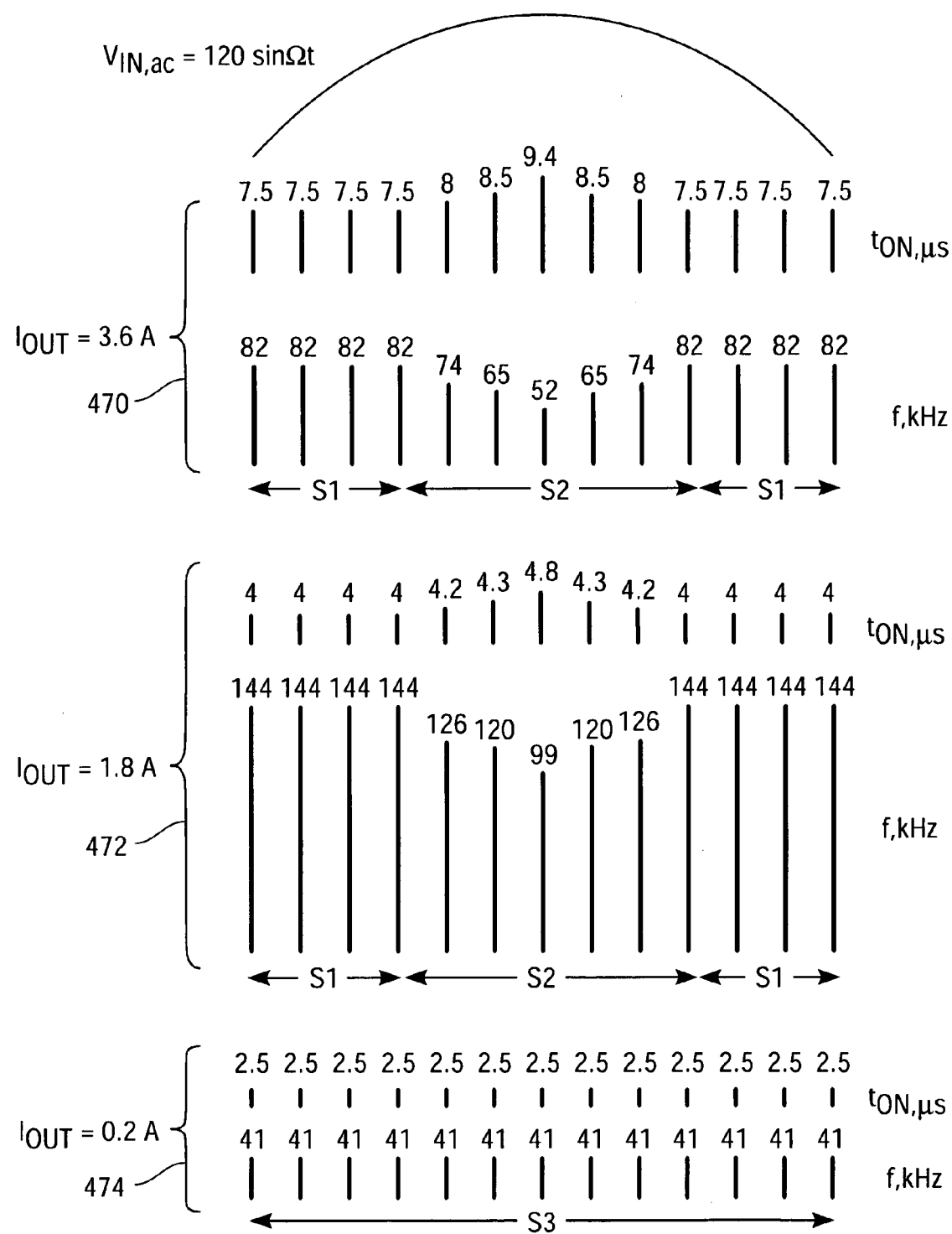
FIG. 4F is a graph illustrating the on-times and frequency distributions generated by the switch controller module of FIGS. 4A and 4C with varying load currents.

FIG. 4F is a graph illustrating the on-times and frequency distributions generated by the switch controller module of FIGS. 4A and 4C with varying load currents. As explained above, the on-times and off-times in S1 mode are fixed. However, both values are adjusted to a new set of parameters corresponding to changes of input RMS voltage or converter load, shown as graphs 470 for $I_{OUT} = 3.6A$ and graphs 472 for $I_{OUT} = 1.8A$ in FIG. 4F. These sets of parameters are generated based on the value of the control voltage $V_{Iavg}$. As shown in FIG. 4F, the less $V_{Iavg}$ is (i.e., the less $I_{OUT}$ is), the less power is delivered to the output, the less are on-times, and the higher is the frequency. However, there is a practical limit to a minimum on-time for any particular value of the output power or converter load with which the power converter 200, 248 can operate reliably. As such, as explained above and as will be explained in more detail below, the power converter 200, 248 includes a third mode (S3 mode) to deal with very low minimum on-times of the switch 106.

Figure 4G:
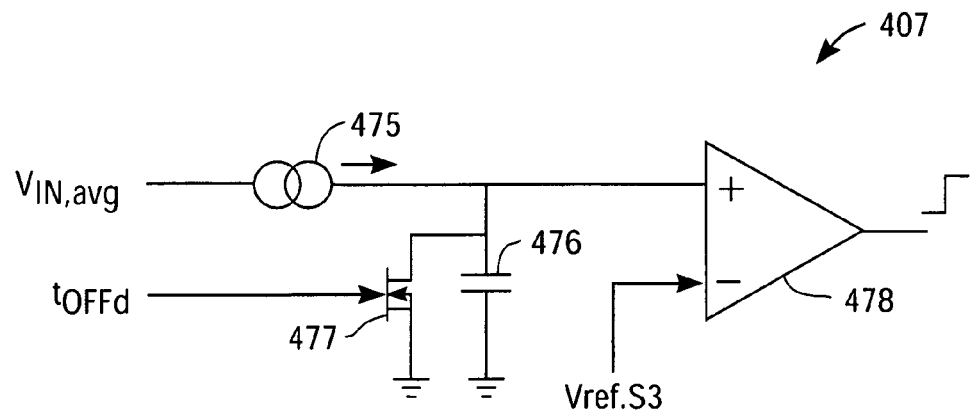
FIG. 4G is a block diagram of the S3 mode comparator according to one embodiment of the present invention.

Referring back to FIG. 4A, the mode selector 116 includes an S3 comparator 407, which is illustrated in more detail in FIG. 4G. Referring to FIG. 4G, $V_{IN,avg}$ is coupled to a current source 475 which charges the capacitor 476 during on-time thereby creating a positive ramp on the non-inverting terminal of the comparator 478. The inverting terminal of the comparator 478 is connected to a constant reference voltage $V_{ref,S3}$. When the ramp generated at the capacitor 476 exceeds the reference voltage $V_{ref,S3}$, the output of the comparator 478 becomes high sending a signal to the S3 mode determination module 408. The capacitor 476 is discharged by the switch 477 driven by the $t_{OFFd}$ signal which is the $t_{ON}$ signal (output from the $T_{ON}$ comparator 419) delayed by a short period of time shown in FIG. 4H as "Delay." The $t_{OFFd}$ signal is generated in the digital logic module 426.

Figure 4H:
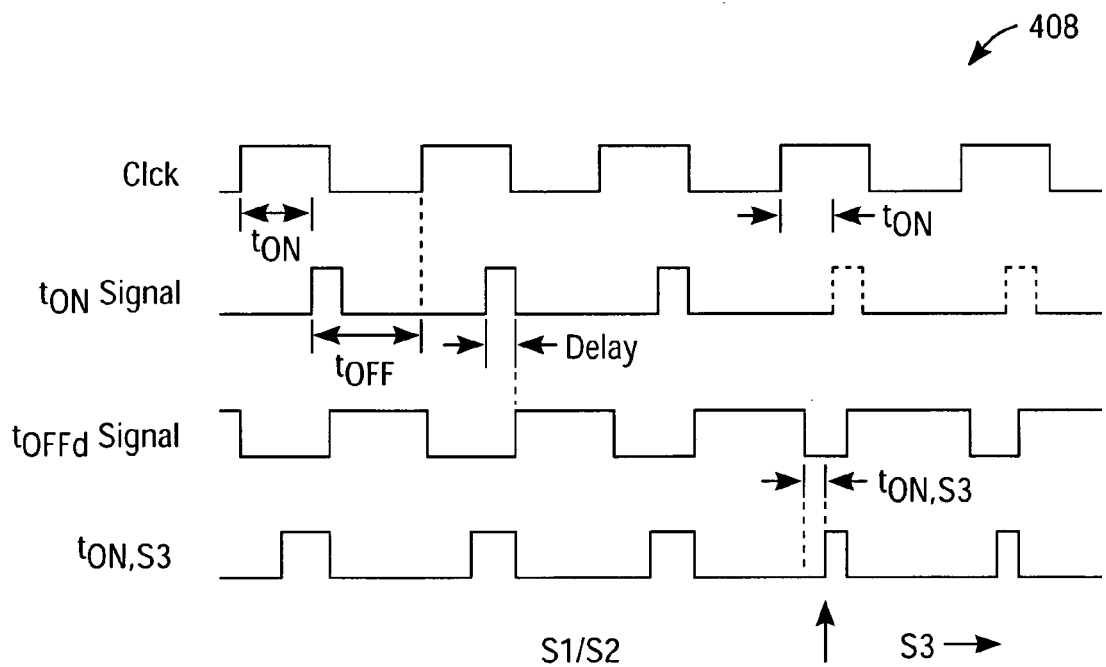
FIG. 4H is a timing diagram of the signals used in the S3 mode determination module shown in FIGS. 4A and 4C.

FIG. 4H illustrates the operation principles of the S3 mode determination module 408. In the S3 mode determination module 408, the output (the $t_{ON}$ signal) of the on-time comparator 419 is compared with the clock signal (Clck) to calculate $t_{ON}$. The output (the $t_{ON,S3}$ signal) of the comparator 478 in the S3 mode comparator module 407 is also compared with the $t_{OFFd}$ signal to calculate $t_{ON,S3}$. When $t_{ON}$ generated by the on-time comparator 419 is greater than the $t_{ON,S3}$ generated by the S3 comparator 407, the power converter 200, 248 runs in S1/S2 mode. When $t_{ON}<=t_{ON,S3}$, then the system on-time becomes equal to $t_{ON,S3}$ and the power converter 200, 248 runs in S3 mode with fixed on-times equal to $t_{ON,S3}$ and variable off-time generated by the $T_{off}$ slope generator 418 and the comparator 420. The $t_{ON,S3}$ signal is adjusted in the S3 comparator module 407 to reflect changes in $V_{IN,avg}$ such that:

$$\int_0^{ON,S3} V_{IN,avg}\, dt = \text{constant.}$$

As stated previously, the S3 mode may be triggered by comparing the output current to a predetermined minimum value as illustrated in FIG. 3F. In such case, as shown in FIG. 4B, an Iout comparator 456, coupled to the output $V_{Iavg}$ of the regulator module 120 and a reference $V_{ref,Iout}$, selects the S3 mode when $V_{Iavg}>V_{ref,Iout}$ and selects S1/S2 mode when $V_{Iavg}<V_{ref,Iout}$. The Iout comparator 456 is connected to digital logic 117 which processes the outputs of the Iout comparator 456 and enables the switching algorithms 134 to select and execute the proper operation modes.

The S3 mode is an implementation of pulse frequency modulation, such that the power converter operates with constant on-time, constant frequency, and variable off-time, as explained above. In FIG. 4F, graphs 474 show the distribution of the on-times and frequencies in the S3 mode.

In the S1 and S2 modes, the control voltage $V_{Iavg}$ is used to generate on-time in a closed loop system. In S1 and S2 modes, the off-time is defined by the power converter 200, 248 operating in CDCM and the off-time slope generator 418 is disabled. When the power converter 200, 248 transitions into S3 mode, the closed loop structure changes as well, disabling the Ton slope generator 416 input to the digital logic 426 and enabling the $T_{off}$ slope generator 418 input into the digital logic 426. In the S3 mode, the power converter 200, 248 operates with fixed on-time of the switch 106, adjustable in accordance with RMS value of the input voltage, and with fixed off-time of the switch 106, regulated in accordance with the level of the load and the RMS value of the input voltage. In order to accommodate light load to no load regulation, the range of off-time should be quite substantial, at least 1:1000. To increase accuracy and linearity, in one embodiment, the $T_{off}$ slope generator 418 and the comparator 420 are implemented in digital form. The digital $T_{off}$ slope generator 418 and the comparator 420 have a memory (not shown) with piece-wise linear approximation of off-time dependency for different control voltages $V_{Iavg}$. In real time, the power converter uses $V_{Iavg}$ as an entry parameter and develops off-time corresponding to the instantaneous values of the control voltage $V_{Iavg}$.

As discussed previously in Equation (2), the output power is:

$$P_o = \frac{V_{inrms}^2}{2L} \times \frac{1}{T_0}\int_0^{T_o} D(i)^2 T_s(i)\, dt_i \qquad (2)$$

In order to regulate the output power $P_o$ with a constant magnetizing inductance L, it is possible to change three parameters, i.e., the RMS input voltage $V_{inrms}$, the duty cycle D(i) and the frequency $T_s(i)$.

According to the switch controller 104 of the present invention, the regulator module 120 is constructed in such a way that the control functions are divided into two tasks: first, to compensate for changes in the RMS value of the input voltage $V_{inrms}$, and second, to compensate for changes in the output load. As it follows from Equation (2), output power is proportional to square of the RMS value of the input voltage, i.e., $V_{inrms}^2$. The feed-forward voltage $V_F$ is used with the control voltage $V_{Iavg}$ in the on-time control adder 414 to generate on-time compensating for the input voltage changes. The control voltage $V_{Iavg}$ is used to compensate for changes in load. In other words, $V_{Iavg}=D(i)^2 * T_S(i)=k$. By dividing the controller functions in two and having the control voltage $V_{Iavg}$ to be equal to a product of $D(i)^2 T_S(i)=k$, two technical tasks are combined into one. By adjusting fixed values of $V_{Iavg}=k$ to correspond to certain values of output load, the amplitude of the input sinusoidal current and the output voltage are regulated at the same time. The power converter 200, 248 operates as a regulated current source, of which the amplitude of the current is adjusted so that a constant voltage is delivered across the load 240 impedance, which may vary arbitrarily.

This also means that the control voltage $V_{Iavg}$ is proportional to the output power, and this feature is also used to generate secondary power and a secondary current limit. In conventional applications of secondary power/current limits, there is a secondary sense network, which is a transmission circuit via isolated (typical optocoupler) and shut down circuits. All these secondary sense networks can be eliminated if control is exercised from the primary side of the fly-back converter 200, 248. According to the present invention, if the controller voltage $V_{Iavg}$ reaches its limit $V_{Iavg}=V_{Iavg,max}$, the control voltage $V_{Iavg}$ will be limited to $V_{clim}$ provided by the current limit module 412. In such case, the power converter 200, 248 operates in an open loop with the clamped output power corresponding to the value of $V_{Iavg,max}$. In case the output current needs to be limited, $V_{clim}$ will be generated as DC bias voltage (for selecting the ramp of the fold back of current limit) and the positive feedback voltage $V_{FB}$ proportional to the output voltage. If the output power Po is equal to $mV_{Iavg}$, then Po=IoVo= m(nVo), where m and n are coefficients between real values and scaled-down signals used in the regulator 120. The transition from $V_{Iavg}$ to $V_{clim}$ occurs without any delays or overshoots as soon as the control voltage reaches its peak at $V_{Iavg,max}$ and is carried out in the digital logic 426.

FIG. 4C is a block diagram illustrating the switch controller module of the flyback power converter shown in FIGS. 2A and 2B according to another embodiment of the present invention. The switch controller module 104 shown in FIG. 4C has the same features as described above for the switch controller module 104 of FIG. 4A, except that it has a more complicated device multiplier 417 instead of adder 414. Referring to FIG. 4C, on-time generation is carried out by multiplication of $V_{ref}$ by the control voltage $V_{Iavg}$ in the multiplier 417 and using the feed-forward voltage $V_F$ in the on-time ramp generator 416. The switch controller module 104 of FIG. 4C achieves improved linearity for the on-times $t_{ON}$ as a function of the control voltage $V_{Iavg}$ at the expense of the simplicity of the adder 416.

Figure 5A:
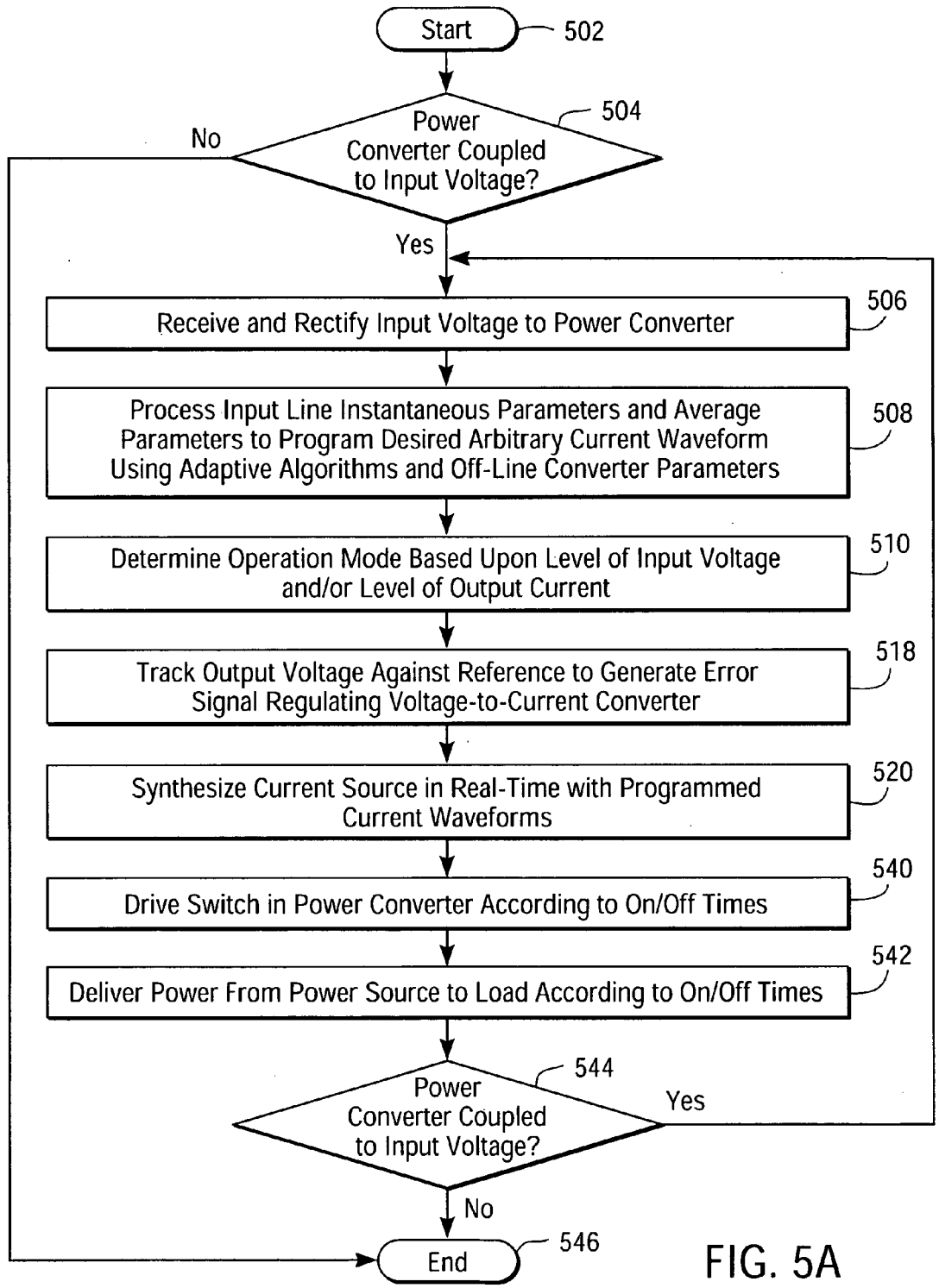
FIG. 5A is a flowchart illustrating the method of controlling the power converter according to a plurality of operation modes, in accordance with one embodiment of the present invention.

FIG. 5A is a flowchart illustrating the method of controlling the power converter according to a plurality of operation modes, in accordance with one embodiment of the present invention. Referring to FIG. 5A, the process is started 502 and it is determined 504 whether the power converter is coupled to input voltage. It not, then the process ends 546. If the power converter is coupled to input voltage 504, the power converter receives and rectifies 506 the input voltage to the power converter. The power converter processes 508 input line instantaneous parameters and average parameters of the power converter to program a desired arbitrary input current waveform using adaptive algorithms and off-line converter parameters, thereby generating waveform synthesis parameters. The power converter also monitors the level of output current and input voltage to determine 510 an operation mode based upon the level of the rectified input voltage and/or the level of output current. Then, the power converter tracks 518 the output voltage against a reference to generate an error signal regulating the voltage-to-current converter. Next, the power converter synthesizes 520 a current source in real time with the programmed current waveforms and generates 540 on/off times to drive the switch in the power converter. This step is carried out according to the waveform synthesis parameters and the determined operation mode. As a result, electrical power is delivered 542 from the power source to the load according to the on-times/off-times generated in step 540. The power converter keeps monitoring 544 whether the power converter is coupled to input voltage and repeats steps 506–544 as long as there is a power source coupled to the input of the power converter; otherwise the process ends 546.

Figure 5B:
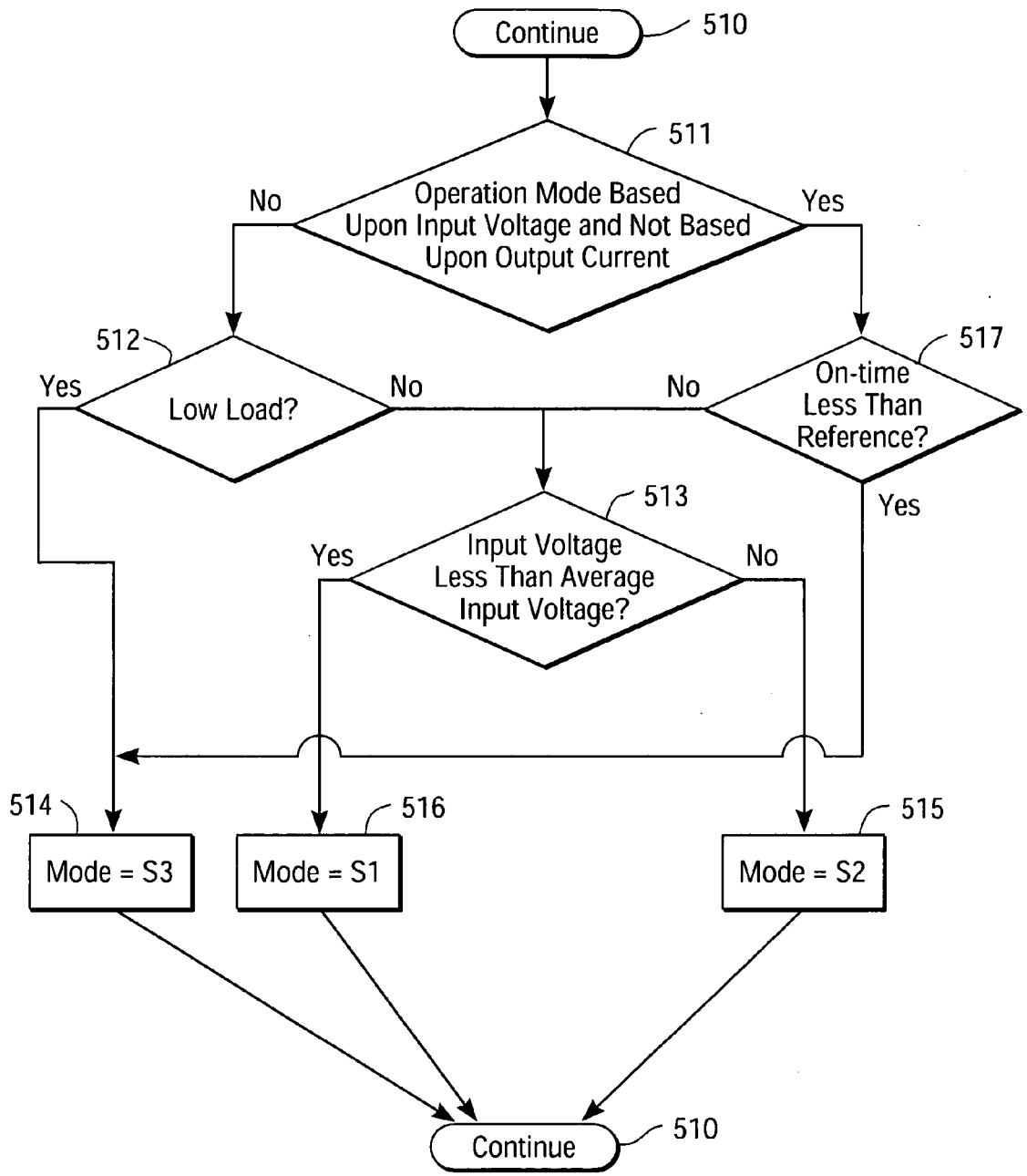
FIG. 5B is a flowchart illustrating the step of determining the operation modes in accordance with one embodiment of the present invention.

FIG. 5B is a flowchart illustrating the step 510 of determining the operation modes in accordance with one embodiment of the present invention. Referring to FIG. 5B, the process continues from step 510 and determines 511 whether the operation modes should be selected based upon input voltage or output current. If it is determined in step 511 that modes should not be selected based upon input voltage, the process determines whether 512 the load is low. If the load is low, then the mode is set 514 as S3 mode and the process continues 510. If the load is not low, then it is determined 514 whether the input voltage is less than the average input voltage. If the input voltage is less than the average input voltage, then the operation mode is set 516 as S1 mode and the process continues 510. If the input voltage is larger than the average input voltage, the operation mode is set 515 as S2 mode and the process continues 510. If it is determined in step 511 that modes should be selected based upon input voltage and not based upon output current, then the process determines 517 whether the required on-time is less than a minimum reference. If not, the process continues to step 513. If yes, the process continues to step 514.

Figure 5C:
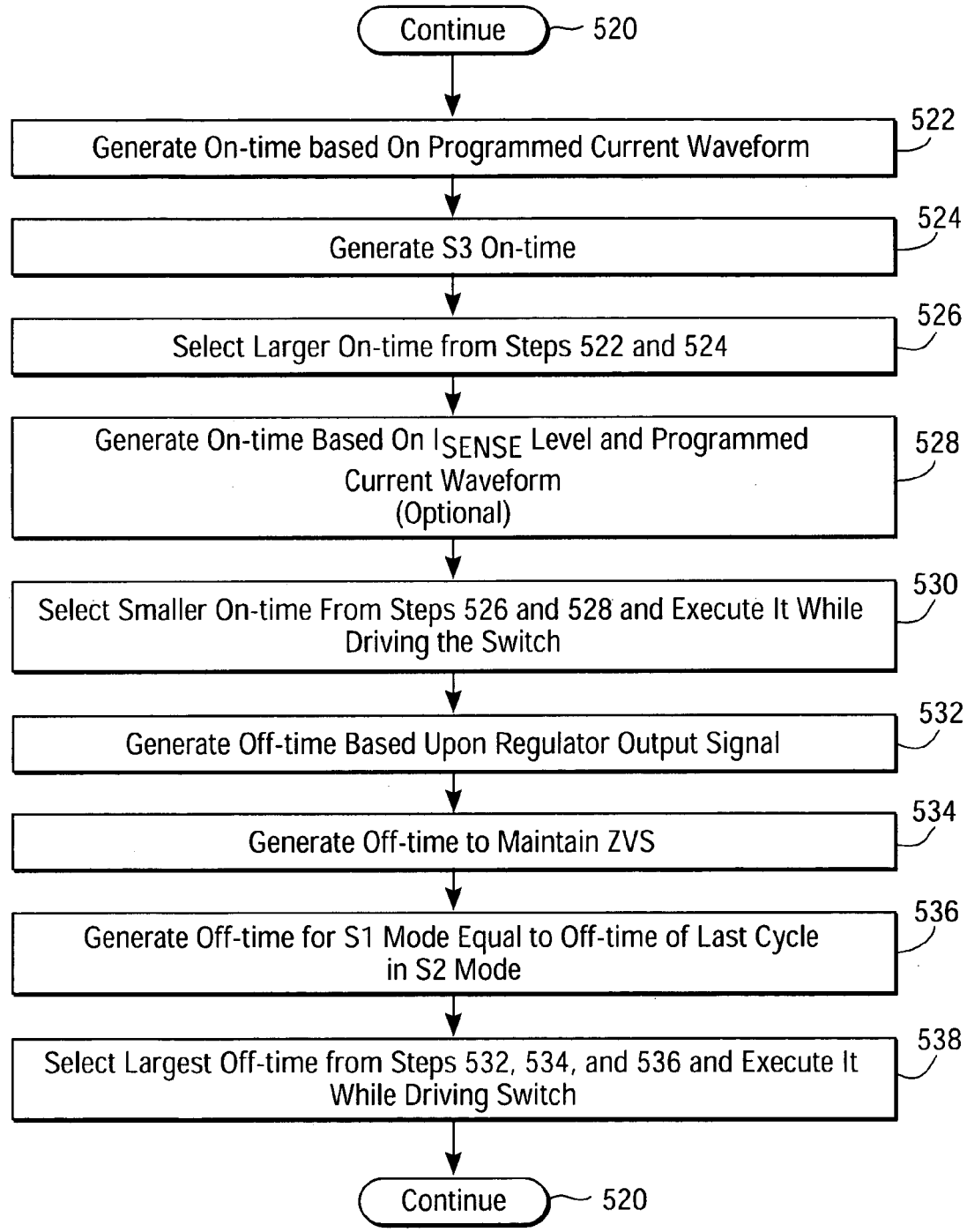
FIG. 5C is a flowchart illustrating the step of synthesizing the current source in real time with a preprogrammed current waveform in accordance with another embodiment of the present invention.

FIG. 5C is a flowchart illustrating the step 520 of synthesizing a current source in real time with the programmed current waveform. As illustrated above, the current synthesizer module executes operation modes as described in FIG. 3D. According to the present invention, the selection of operation modes are implemented by enabling or disabling appropriate parts of the switch controller 104 at a physical level as explained in the flowcharts of FIGS. 5A and 5B. According to another embodiment of the present invention, all parts of the switch controller 104 operate in parallel and they are considered by the digital logic 426 as competing requests to the power stage 102. The actual selection of on-times and off-times of the switch 106 is carried out by algorithms 134 in the digital logic 426. FIG. 5C illustrates how the selection and execution of operation modes is carried out.

As the process continues 520, the on-times are generated 522 based upon the programmed current waveform and the S3 reference on-time is generated and received 524 from the Ton comparator 419. In step 526, the larger of the on-time generated in step 522 and the S3 reference on-time generated in step 524 is selected 526. In step 528, the process generates on-time based on the $I_{SENSE}$ level and the programmed current waveform. Then, the process selects 530 the smaller of the on-times generated in steps 526 and 528 and executes the on-time while driving the switch 106. The process also accepts off-time requests as generated by the Toff comparator 420 based upon the output signal from the regulator module 120. The process also generates 534 off-time as the digital logic 426 extracts from signal $V_{AUX}$ the necessary off-time for the switch to maintain CDCM and zero-voltage switching in the power converter. The process then generates 536 off-times for the S1 mode equal to the off-time of the immediately preceding cycle in S2 mode. The process selects 538 the largest of the off-times generated in steps 532, 534, and 536 and executes the selected off-time while driving the switch 106 and the process continues 520.

The power converter of the present invention and the method for controlling the power converter can deliver electrical power from a power source to a load with a high power factor over a wide range of input voltage while regulating the output voltage, because different operation modes optimally suited for input current shaping over different ranges of input voltage are used to control the power converter. The power converter and the method for controlling the power converter of the present invention are compatible with different topologies of power converters.

Figure 6A:
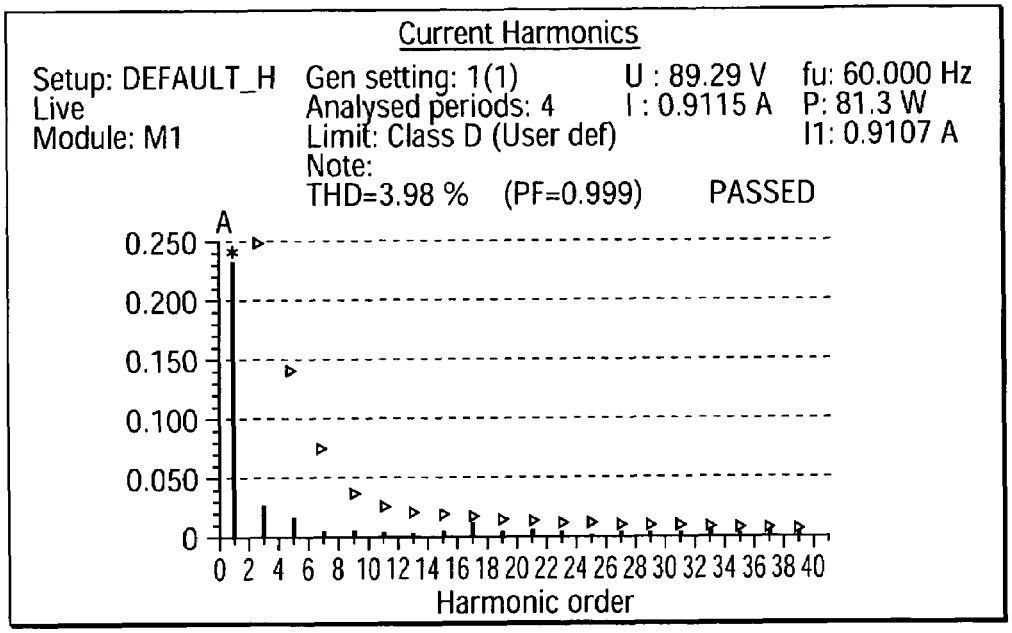
FIGS. 6A and 6B are diagrams illustrating the voltage and current waveforms output by the power converter shown in FIG. 2B.
Figure 6A:
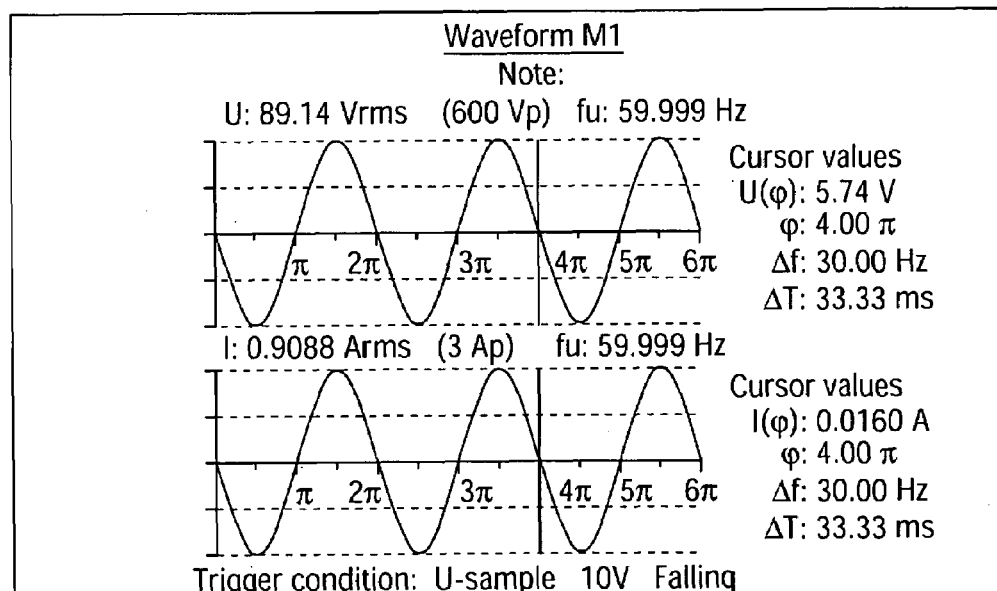
Figure 6B:
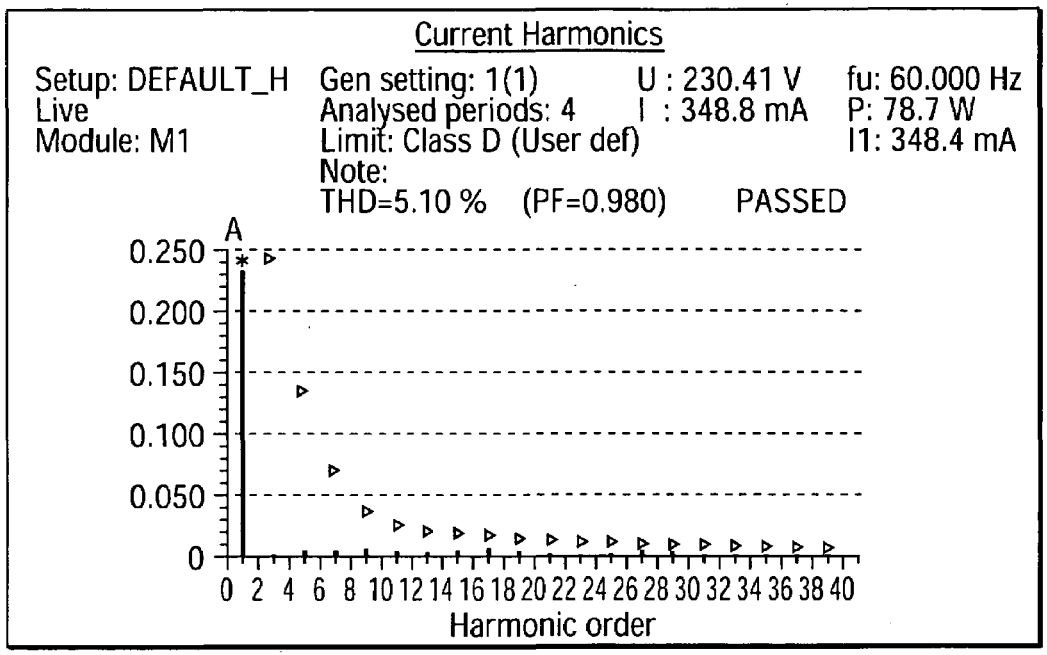
Figure 6B:
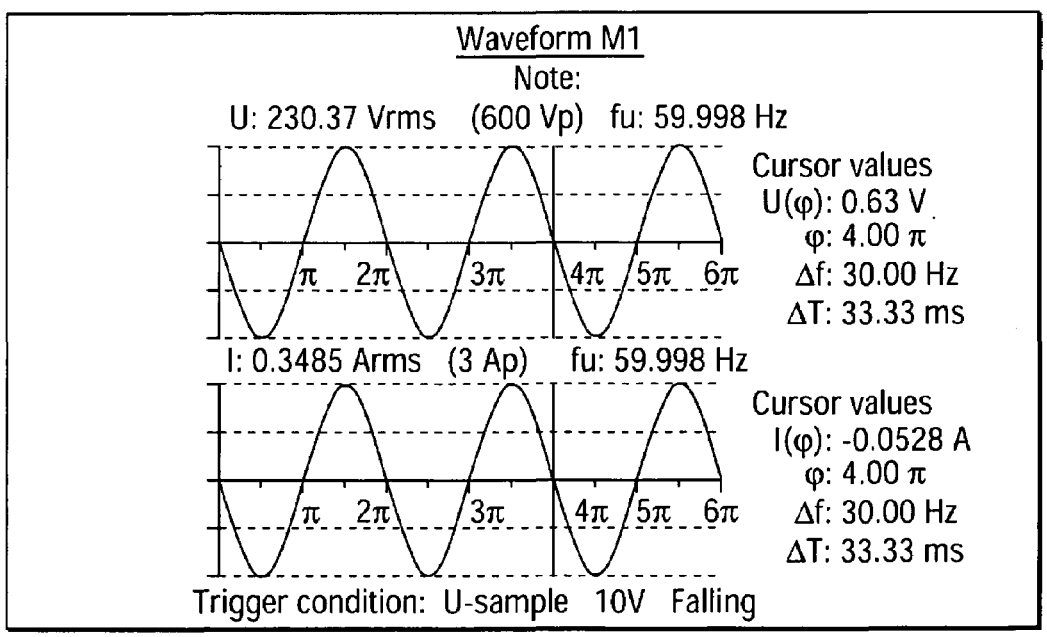

FIGS. 6A and 6B are diagrams illustrating the voltage and current waveforms output by the power converter shown in FIG. 2B. FIG. 6A illustrates the voltage and current waveforms measured when the AC line input voltage was 90 V and FIG. 6B illustrates the voltage and current waveforms measured when the AC line input voltage was 230 V, as well as their harmonic distortion levels. Both FIGS. 6A and 6B show that the voltage and current waveforms are in phase and have very low harmonic distortions.

Figure 7:
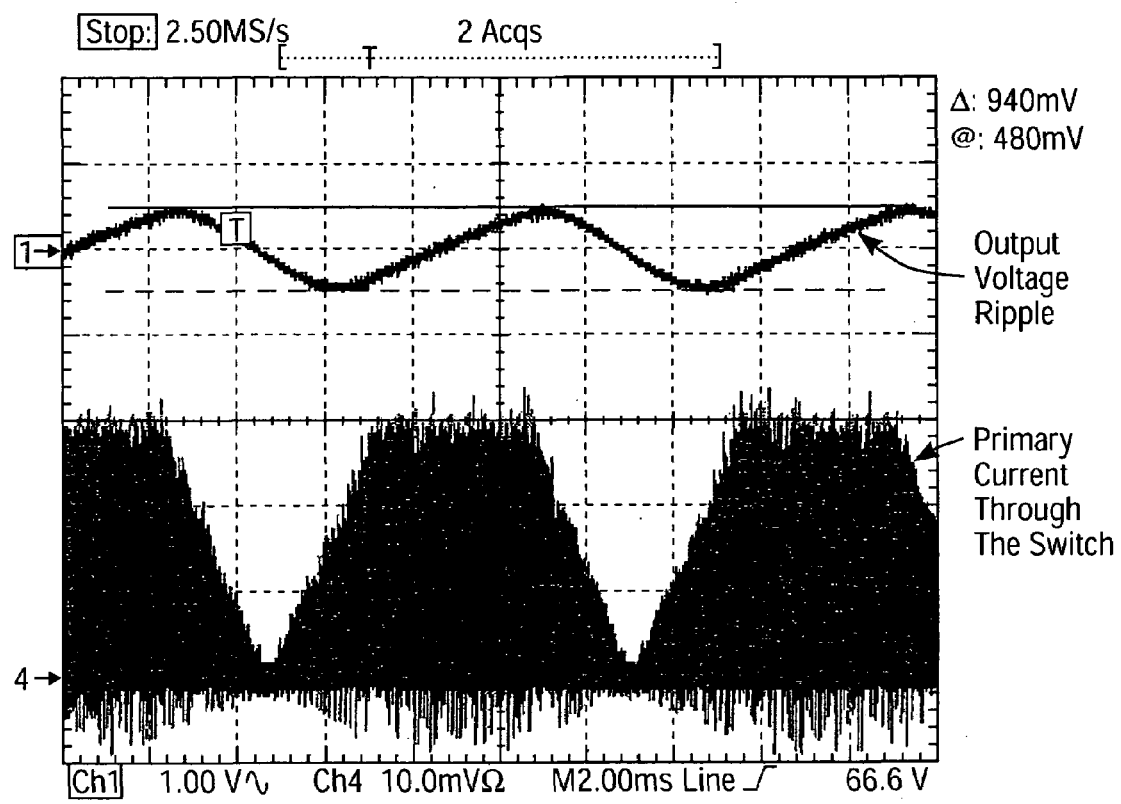
FIG. 7 is a diagram illustrating the output voltage ripple and the primary current through the switch in the power converter when the input current has a trapezoidal shape, according to another embodiment of the present invention.

FIG. 7 is a diagram illustrating the output voltage ripple and the primary current through the switch in the power converter shown in FIG. 2B when the input current has a trapezoidal shape, according to another embodiment of the present invention. As shown in FIG. 7, the output voltage ripple is significantly reduced when the input current to the power converter has a trapezoidal shape.

Although the present invention has been described above with respect to several embodiments, various modifications can be made within the scope of the present invention. The operation modes used with the power converter are not limited to those described in FIG. 3D, but any type or number of operation modes can be used with the power converter consistent with the present invention as long as those operation modes generates on-times and off-times for driving the switch in the power converter such that an arbitrary shape of input current waveform is achieved. For example, the power converter may have only two modes, such as S1 and S2 modes, without the S3 mode as described in FIG. 3D if it does not operate with light loads. The various circuits and modules described in FIGS. 2A, 2B, 4A, 4B, 4C, 4D, and 4G are merely exemplary, and one skilled in the art will recognize that the circuitry and modules therein may be implemented in various manners using various technologies, digital or analog. Accordingly, the disclosure of the present invention is intended to be illustrative, but not limiting, of the scope of the invention, which is set forth in the following claims.

What is claimed is:

1. A method of shaping input current to a power converter, the method comprising:
   the power converter determining waveform synthesis parameters based upon an input voltage signal and a reference waveform shape;
   the power converter selecting one of a plurality of operation modes for controlling on-times and off-times of a switch in the power converter, the operation modes including a first operation mode selected if an input voltage to the power converter is in a first input voltage range, a second operation mode selected if the input voltage to the power converter is in a second input voltage range, and a third operation mode selected if an output current from the power converter is lower than a predetermined threshold current or if the on-times are lower than a predetermined threshold on-time; and
   the power converter synthesizing the input current waveform in real time by controlling on-times and off-times of the switch based upon the determined waveform synthesis parameters and the selected operation modes.

2. The method of claim 1, wherein the power converter is a flyback power converter and wherein:
   the first operation mode controls the switch such that the power converter is operated in discontinuous conduction mode with fixed frequency with the on-times and off-times fixed; and
   the second operation mode controls the switch such that the power converter is operated with variable frequency and variable duty cycle in critical discontinuous conduction mode with the on-times modulated by input instantaneous voltage and the off-times determined by requirements for the critical discontinuous conduction mode.

3. The method of claim 2, wherein in the second operation mode the on-times are modulated by the input instantaneous voltage to keep a product of a squared duty ratio and a cycle time in the second operation mode to be constant and proportional to output power.

4. The method of claim 3, wherein in the first operation mode the on-times and the off-times are fixed so that a product of a squared duty ratio and a cycle time in the first operation mode is constant and equal to the product in the second operation mode.

5. The method of claim 1, wherein the first input voltage range corresponds to when the input voltage to the power converter is lower than an average of the input voltage and the second input voltage range corresponds to when the input voltage to the power converter is higher than the average of the input voltage.

6. The method of claim 1, wherein the third operation mode controls the switch such that the power converter is operated in discontinuous conduction mode with the on-times and the off-times fixed.

7. The method of claim 6, wherein the on-times and the off-times in the third operation mode are fixed and determined by pulse frequency modulation.

8. The method of claim 6, wherein synthesizing the input current waveform in real time comprises:
   generating a first on-time based on the reference waveform shape;
   generating a second on-time based on the third operation mode;
   selecting a larger one of the first and second on-times to generate a third on-time;
   generating a fourth on-time based upon a current through the switch and the reference waveform shape;
   selecting a smaller one of the third and fourth on-times as the on-time for the switch;
   generating a first off-time based upon a control voltage indicating a difference between an output feedback voltage and a reference feedback voltage;
   generating a second off-time for maintaining zero voltage switching;
   generating a third off-time for the first operation mode to be equal to an off-time of an immediately preceding switching cycle of the second operation mode; and
   selecting a largest one of the first, second, and third off-times as the off-time for the switch.

9. A power converter comprising:
   a power stage for transferring electrical power from a power source to a load;
   a switch in the power stage that electrically couples or decouples the load to or from the power source; and
   a switch controller coupled to the switch for shaping input current to the power converter, the switch controller including;
   a current shaper module for determining waveform synthesis parameters based upon an input voltage signal and a reference waveform shape;
   an operation mode selector module for selecting one of a plurality of operation modes for controlling on-times and off-times of a switch in the power converter, the operation modes including a first operation mode selected if an input voltage to the power converter is in a first input voltage range, a second operation mode selected if the input voltage to the power converter is in a second input voltage range and a third operation mode selected if an output current from the power converter is lower than a predetermined threshold current or if the on-times are lower than a predetermined threshold on-time; and
   a current waveform synthesizer module for synthesizing the input current waveform in real time by controlling on-times and off-times of the switch based upon the determined waveform synthesis parameters and the selected operation modes.

10. The power converter of claim 9, wherein the power converter is a flyback power converter and wherein:
    the first operation mode controls the switch such that the power converter is operated in discontinuous conduction mode with the on-times and off-times fixed; and
    the second operation mode controls the switch such that the power converter is operated in critical discontinuous conduction mode with the on-times modulated by the input voltage and the off-times determined by requirements for the critical discontinuous conduction mode.

11. The power converter of claim 10, wherein in the second operation mode the on-times are modulated by the input instantaneous voltage to keep a product of a squared duty ratio and a cycle time in the second operation mode to be constant and proportional to output power.

12. The power converter of claim 11, wherein in the first operation mode the on-times and the off-times are fixed so that a product of a squared duty ratio and a cycle time in the first operation mode is constant and equal to the product in the second operation mode.

13. The power converter of claim 9, wherein the third operation mode controls the switch such that the power converter is operated in discontinuous conduction mode with the on-times and the off-times fixed.

14. The power converter of claim 13, wherein the on-times and the off-times in the third operation mode are fixed and determined by pulse frequency modulation.

15. The power converter of claim 9, wherein the switch controller further includes a feedback signal generator for generating an analog feedback signal representing an output voltage of the power converter, the feedback signal generator including:
    a first comparator for comparing a voltage sensed at an auxiliary winding of a transformer in the power stage with a constant zero voltage switching reference voltage to generate a first comparator output signal;
    a second comparator for comparing the voltage sensed at the auxiliary winding of the transformer in the power stage with the analog feedback signal to generate a second comparator output signal;
    a sampling module for determining delta differences between high and low edges of the first comparator output signal and the second comparator output signal;
    a summation module for summing the delta differences to generate a digital feedback signal; and
    a digital-to-analog converter for converting the digital feedback signal to the analog feedback signal.

16. The power converter of claim 9, wherein the current waveform synthesizer module includes:
    an adder for adding a control voltage indicating a difference between an output feedback voltage and a reference feedback voltage to a feed-forward voltage indicating a squared value of an average input voltage;
    an on-time slope generator for generating an on-time ramp signal using an output of the adder;
    a first comparator for comparing the on-time ramp signal with a reference voltage to generate on-times for the switch;
    an off-time slope generator for generating an off-time ramp signal using the control voltage; and
    a second comparator for comparing the off-time ramp signal with an off-time reference voltage to generate off-times for the switch.

17. The power converter of claim 9, wherein the current waveform synthesizer module includes:
    a multiplier for multiplying a control voltage indicating a difference between an output feedback voltage and a reference feedback voltage to a reference voltage;
    an on-time slope generator for generating an on-time ramp signal based upon a feed-forward voltage indicating a squared value of an average input voltage;
    a first comparator for comparing the on-time ramp signal with an output of the multiplier to generate on-times for the switch;
    an off-time slope generator for generating an off-time ramp signal based upon the control voltage; and
    a second comparator for comparing the off-time ramp signal with an off-time reference voltage to generate off-times for the switch.

18. A controller for controlling a power converter, the power converter including a power stage for transferring electrical power from a power source to a load and a switch in the power stage that electrically couples or decouples the load to or from the power source, wherein the controller is coupled to the switch for shaping input current to the power converter, the controller comprising:
    a current shaper module for determining waveform synthesis parameters based upon an input voltage signal and a reference waveform shape;
    an operation mode selector module for selecting one of a plurality of operation modes for controlling on-times and off-times of a switch in the power converter, the operation modes including a first operation mode selected if an input voltage to the power converter is in a first input voltage range, a second operation mode selected if the input voltage to the power converter is in a second input voltage range, and a third operation mode selected if an output current from the power converter is lower than a predetermined threshold current or if the on-times are lower than a predetermined threshold on-time; and
    a current waveform synthesizer module for synthesizing the input current waveform in real time by controlling on-times and off-times of the switch based upon the determined waveform synthesis parameters and the selected operation modes.

19. The controller of claim 18, wherein the power converter is a flyback power converter and wherein:
    the first operation mode controls the switch such that the power converter is operated in discontinuous conduction mode with the on-times and off-times fixed; and
    the second operation mode controls the switch such that the power converter is operated in critical discontinuous conduction mode with the on-times modulated by the input voltage and the off-times determined by requirements for the critical discontinuous conduction mode.

20. The controller of claim 19, wherein in the second operation mode the on-times are modulated by the input instantaneous voltage to keep a product of a squared duty ratio and a cycle time in the second operation mode to be constant and proportional to output power.

21. The controller of claim 20, wherein in the first operation mode the on-times and the off-times are fixed so that a product of a squared duty ratio and a cycle time in the first operation mode is constant and equal to the product in the second operation mode.

22. The controller of claim 18, wherein the third operation mode controls the switch such that the power converter is operated in discontinuous conduction mode with the on-times and the off-times fixed.

23. The controller of claim 22, wherein the on-times and the off-times in the third operation mode are fixed and determined by pulse frequency modulation.

24. The controller of claim 18, further comprising a feedback signal generator for generating an analog feedback signal representing an output voltage of the power converter, the feedback signal generator including:

a first comparator for comparing a voltage sensed at an auxiliary winding of a transformer in the power stage with a constant zero voltage switching reference voltage to generate a first comparator output signal;

a second comparator for comparing the voltage sensed at the auxiliary winding of the transformer in the power stage with the analog feedback signal to generate a second comparator output signal;

a sampling module for determining delta differences between high and low edges of the first comparator output signal and the second comparator output signal;

a summation module for summing the delta differences to generate a digital feedback signal; and a digital-to-analog converter for converting the digital feedback signal to the analog feedback signal.

25. The controller of claim 18, wherein the current waveform synthesizer module includes:

an adder for adding a control voltage indicating a difference between an output feedback voltage and a reference feedback voltage to a feed-forward voltage indicating a squared value of an average input voltage;

an on-time slope generator for generating an on-time ramp signal using an output of the adder;

a first comparator for comparing the on-time ramp signal with a reference voltage to generate on-times for the switch;

an off-time slope generator for generating an off-time ramp signal using the control voltage; and a second comparator for comparing the off-time ramp signal with an off-time reference voltage to generate off-times for the switch.

26. The controller of claim 18, wherein the current waveform synthesizer module includes:

a multiplier for multiplying a control voltage indicating a difference between an output feedback voltage and a reference feedback voltage to a reference voltage;

an on-time slope generator for generating an on-time ramp signal based upon a feed-forward voltage indicating a squared value of an average input voltage;

a first comparator for comparing the on-time ramp signal with an output of the multiplier to generate on-times for the switch;

an off-time slope generator for generating an off-time ramp signal based upon the control voltage; and a second comparator for comparing the off-time ramp signal with an off-time reference voltage to generate off-times for the switch.

27. A power converter comprising:

transferring means for transferring electrical power from a power source to a load;

switching means in the transferring means that electrically couples or decouples the load to or from the power source; and controlling means coupled to the switching means for shaping input current to the power converter based on a reference waveform shape, the controlling means comprising:

current shaping means for determining waveform synthesis parameters based upon an input voltage signal and the reference waveform shape;

operation mode selection means for selecting one of a plurality of operation modes for controlling on-times and off-times of a switch in the power converter, the operation modes including a first operation mode selected if an input voltage to the power converter is in a first input voltage range, a second operation mode selected if the input voltage to the power converter is in a second input voltage range, and a third operation mode selected if an output current from the power converter is lower than a predetermined threshold current or if the on-times are lower than a predetermined threshold on-time; and current waveform synthesis means for synthesizing the input current waveform in real time by controlling on-times and off-times of the switch based upon the determined waveform synthesis parameters and the selected operation modes.

* * * * *